US009602734B2

(12) United States Patent
Fergus et al.

(10) Patent No.: US 9,602,734 B2
(45) Date of Patent: Mar. 21, 2017

(54) METHODS, COMPUTER-ACCESSIBLE MEDIUM AND SYSTEMS FOR FACILITATING DARK FLASH PHOTOGRAPHY

(71) Applicant: NEW YORK UNIVERSITY, New York, NY (US)

(72) Inventors: Robert Fergus, New York, NY (US); Dilip Krishnan, Jersey City, NJ (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 15/152,372

(22) Filed: May 11, 2016

(65) Prior Publication Data

US 2016/0330358 A1 Nov. 10, 2016

Related U.S. Application Data

(63) Continuation of application No. 13/133,822, filed as application No. PCT/US2010/020511 on Jan. 8, 2010, now Pat. No. 9,354,490.

(Continued)

(51) Int. Cl.
*H04N 5/33* (2006.01)
*G03B 15/03* (2006.01)
(Continued)

(52) U.S. Cl.
CPC ............ *H04N 5/235* (2013.01); *G03B 15/03* (2013.01); *G06T 5/00* (2013.01); *G06T 7/0085* (2013.01);
(Continued)

(58) Field of Classification Search
CPC ........ H04N 5/235; H04N 5/33; G06T 7/0085; G06T 5/00; G06T 2207/20056
(Continued)

(56) References Cited

U.S. PATENT DOCUMENTS 5,949,914 A * 9/1999 Yuen .................... G01C 11/025
382/254
6,009,340 A * 12/1999 Hsia ........................ A61B 5/00
348/164

(Continued)

FOREIGN PATENT DOCUMENTS

JP 2005/045559 2/2005
JP 2007-215088 8/2007

OTHER PUBLICATIONS

G. Maino, "Digitization and Multispectral Analysis of Historical Books and Archival Documents: Two Exemplary Cases," Image Analysis and Processing Workshops, 2007. ICIAPW 2007. 14th International Conference on, Modena, 2007, pp. 119-124.*

(Continued)

*Primary Examiner* — William C Vaughn, Jr.
*Assistant Examiner* — Naod Belai
(74) *Attorney, Agent, or Firm* — Andrews Kurth Kenyon LLP

(57) ABSTRACT

Exemplary embodiments of the present disclosure relate generally to methods, computer-accessible medium and systems for dark flash photography. For example, described herein is an exemplary embodiment of an apparatus for providing illumination and obtaining an image, which can include, e.g., a first arrangement configured to emit a flash of light including ultra-violet light and/or infra-red light to illuminate a scene and/or one or more subjects, and a second arrangement configured to obtain an image of the illuminated scene and/or one or more subject. A duration of time and/or an intensity level of the flash can be selected, e.g., so that wavelengths of the flash can be substantially invisible to a human eye. For example, the visibility of the flash perceived by the human eye can be, e.g., approximately 200 times less than the visibility of a standard flash of light having substantially the same amount of energy as the flash.

26 Claims, 17 Drawing Sheets

Related U.S. Application Data

(60) Provisional application No. 61/143,684, filed on Jan. 9, 2009, provisional application No. 61/241,300, filed on Sep. 10, 2009.

(51) Int. Cl.
  *H04N 5/235* (2006.01)
  *G06T 5/00* (2006.01)
  *G06T 7/00* (2017.01)

(52) U.S. Cl.
  CPC ..... *H04N 5/33* (2013.01); *G06T 2207/20056* (2013.01)

(58) Field of Classification Search
  USPC .............................. 348/164, E5.09; 382/275
  See application file for complete search history.

(56) References Cited

U.S. PATENT DOCUMENTS

| | | | | |
|---|---|---|---|---|
| 6,998,614 | B2* | 2/2006 | Lanoue | G01N 21/255 250/339.05 |
| 7,103,234 | B2* | 9/2006 | Stone | G06K 9/0063 382/266 |
| 7,425,693 | B2* | 9/2008 | Shapira | G01J 3/2823 244/3.1 |
| 7,457,477 | B2* | 11/2008 | Petschnigg | G06T 5/50 348/370 |
| 7,609,291 | B2* | 10/2009 | Oon | G03B 15/03 348/162 |
| 7,620,269 | B1* | 11/2009 | Nandy | G06K 9/0063 348/263 |
| 2006/0132642 | A1 | 6/2006 | Hosaka et al. | |

OTHER PUBLICATIONS

Takiguchi et al, "New color TV cameras for Ultraviolet, Near Infrared and Visible Light" IEEE vol. 44 No. 1 Mar. 1988.*
International Search Report for the International Application No. PCT/US2010/020511.
Written Opinion for the International Application No. PCT/US2010/020511.
Eisemann et al., Flash photography enhancementvia intrinsic relighting, ACM Transactionson Graphics (Proc. SIGGRAPH)23, 673-678 (2004).
Bennett et al., "Multispectral bilateral video fusion", IEEE Trans. Image Processing 16, 5, 1185-1194 (2007).
Wang, et al. Video relighting using infrared illumination, Computer Graphics Forum 27 (2008).
Farbman et al., Edge-preservingdecompositions for multi-scale tone and detail manipulation, ACM Transactionson Graphics(Proc. SIGGRAPH)27, 671-680 (2008).
Rorslett, B., Flowers in Ultraviolet, available at http://www.naturfotograf.com/UV_flowers_list.html(lastaccessed Jan. 7, 2010).
Park et al., Multispectral Imaging Using Multiplexed Illumination, IEEE, ICCV 1-8 (2007).
Mohan et al., Agile spectrum imaging: Programmable wavelength modulation for cameras and projectors, Computer Graphics Forum 27, 2,709-717 (2008).
Portilla et al., Image denoising using a scale mixture of Gaussians in the wavelet domain, IEEE Trans. Image Processing 12, 11, 1338-1351 (2003).
Fergus etal., Removing camera shake from a single photograph, ACM Transactions on Graphics (Proc.SIGGRAPH) 25,787-794 (2006).
Levin & Weiss "User assisted separation of reflections from a single image using a sparsity prior", IEEE Trans. Pattern Analysis & Machine Intelligence 29,9, 1647-1654 (2007).
Aharonet al., The KSVD: "An algorithm for designing of over complete dictionaries for parse representation", IEEE Trans. Signal Processing 54, 11,4311-4322 (2006).
Roth et al., "Fields of Experts: A Framework for Learning Image Priors", CVPR, 2, 860-867 (2005).
McAuley et al., "Learning high-order MRF priors of color images", ICML06, 617-624 (2006).
Singh et al., "Exploiting spatial and spectral image regularities for color constancy", Workshop on Statistical and Computational Theories of Vision (2003).
Chakrabarti et al., "Color constancy beyond bags of pixels" , CVPR,1-6 (2008).
Jiaya, J., "Single image motion deblurring using transparency" ,CVPR, 1-8 (2007).
Tomasietal., "Bilateral filtering for gray and color images", ICCV, 839-846 (1998).
Yuan et al., "Image deblurring with blurred/noisy image pairs", ACM Transactionson Graphics(Proc. SIGGRAPH)26, 1-10 (2007).
Telleen et al., "Synthetic shutter speed imaging", Computer Graphics Forum 26, 3,591-598 (2007).
Tappen, M. F. et al., "Exploiting the sparse derivative prior for super-resolution and image demosaicing", SCTV (2003).
Rudin et al., "Nonlinear total variation based noise removal algorithms", Physical D 60, 259-268 (1992).
Wang, Y. et al., "A new alternating minimization algorithm fortotal variation image reconstruction",SIAM J.Imaging Sciences 1, 3, 248-272 (2008).
Field, D., "What isthe goal of sensory coding?", Neural Computation, 6, 559-601 (1994).
Levin, et al. "Image and depth from a conventional camera with a coded aperture", ACM TOG (Proc. SIGGRAPH) 26, 3, 70 (2007).
Simoncelli et al., "Noise removal via Bayesian wavelet coring", ICIP 379-382 (1996).
Stewart, C.V., "Robust parameter estimationin computer vision", SIAM Reviews 41, 3, 513-537 (1999).
Joshi et al., Image deblurring and denoisingusing color priors, CVPR (2009).
Wainwright et al., "Scalemixtures of Gaussians and the statistics of natural images", NIPS 855-861 (1999).
Welling et al., "Learning sparse topographic representations with products of student-t distributions", NIPS (2002).
Geman and Reynolds, "Constrained restoration and recovery of discontinuities", PAMI14, 3,367-383 (1992).
Geman and Yang, Nonlinear image recovery with half-quadratic regularization, PAMI4, 932-946 (1995).
Chartrand, "Fast algorithms for nonconvex compressive sensing: MRI reconstruction from very few data", IEEE International Symposium on Biomedical Imaging (2009).
Chartrand and Staneva, "Restricted isometry properties & nonconvex compressive sensing" published by the ACGIH (TLVs 2001).
Baker et al., "Lucas-kanade 20 years on: A unifying framework", International Journal of Computer Vision, 56, 221-255 (2004).
Agrawal et al., "Removing photography artifacts using gradient projection and flash-exposure sampling", ACM Transactionson Graphics (Proc. SIGGRAPH), 24, 828-835 (2005).
Petschnigg et al., "Digital photography with flash and no-flash image pairs" , ACM Transactions on Graphics (Proc. SIGGRAPH) 23, 3, 664-672 (2004).
Osindero et al., "Topographic product models applied to natural scene statistics", Neural Computation (1995).
Wright, et al., "Sparse reconstruction by separable approximation",IEEE Trans. Signal Processing (2009).
W. Richardson, "Bayesian based iterative method of image restoration", 62, 55-59 (1972).
Levin et al, "Understanding and evaluating blind deconvolution algorithms", CVPR (2009).

* cited by examiner

METHODS, COMPUTER-ACCESSIBLE MEDIUM AND SYSTEMS FOR FACILITATING DARK FLASH PHOTOGRAPHY

CROSS-REFERENCE TO RELATED APPLICATION(S)

This application is a continuation of U.S. National Phase patent application Ser. No. 13/133,822 filed on Aug. 22, 2011, which issued as U.S. Pat. No. 9,354,490 on May 31, 2016, and relates to and claims priority from International Patent Application No. PCT/US2010/020511 filed on Jan. 8, 2010, and from U.S. Provisional Patent Application Ser. No. 61/134,684 filed on Jan. 9, 2009 and 61/241,300 filed on Sep. 10, 2009, the entire disclosures of which are incorporated herein by references in their entirety.

FIELD OF THE DISCLOSURE

Exemplary embodiments of the present disclosure relate generally to methods, computer-accessible medium and systems for facilitating dark flash photography.

BACKGROUND INFORMATION

Camera flashes can produce intrusive bursts of light that disturb or dazzle. Provided herein is an exemplary camera and flash that can use infra-red and ultra-violet light outside the visible range to capture and/or obtain pictures and/or images in relatively low-light conditions. This "dark" flash can be, e.g., at least two orders of magnitude dimmer than conventional flashes for a comparable exposure. Building on ideas from flash/no-flash photography, a pair of images can be captured and/or obtained, one using dark flash, the other using dim ambient illumination alone. The relationships and/or correlations between images recorded at different wavelengths can be used to denoise the ambient image and restore fine details to give a high quality result, even in very weak illumination. The processing techniques can also be used to denoise images captured with conventional cameras.

The heavy-tailed distribution of gradients in natural scenes can have proven effective priors for certain problems such as denoising, deblurring and super-resolution. These distributions can be well modeled by a hyper-Laplacian $(p(x) \propto e^{-k|x|^\alpha})$ typically with $0.5 \leq \alpha \leq 0.8$. However, the use of sparse distributions can make the problem non-convex and impractically slow to solve for multi-megapixel images.

The introduction of digital camera sensors has transformed photography, permitting new levels of control and flexibility over the imaging process. Coupled with less expensive computation power, various photographic techniques have been described, collectively known as Computational Photography. Modern camera sensors, whether in a cell phone or a high-end DSLR, typically use either a CCD or CMOS sensor based on silicon. The raw sensor material can respond to light over a wide range of wavelengths, which can typically be, e.g., approximately 350-1200 nanometers (nm). Colored dyes can be deposited onto the sensor pixels in a Bayer pattern, resulting in 3 groups of pixels (e.g., red, green and blue). Each group responds to a limited range of wavelengths, approximating the sensitivities of the three types of cone cells in the human retina, for example. However, silicon is highly sensitive to infra-red (IR) wavelengths and it therefor can be difficult to manufacture dyes that have sufficient attenuation in this region, thus an extra filter is typically placed on top of most sensors to, e.g., block IR light. This yields a sensor that can record only over the range of approximately 400-700 nm. While matching the typical human's color perception, it is generally a considerable restriction of the intrinsic range of the device.

One solution to capturing photographs in low light conditions is to use a flash unit to add light to the scene. Although such solution provides the light to capture otherwise unrecordable scenes, the flash makes the photographic process intrusive. The sudden burst of light not only alters the illumination but typically disturbs people present, making them aware that a photo has just been taken and possibly dazzling them if they happen to be looking toward the camera. For example, a group photo in a dark restaurant using a bright camera flash can leave the subjects unable to see clearly for some moments afterward.

Dark flash camera/flash systems can be based around off-the-shelf consumer equipment, with a number of minor modifications. First, the camera can be a standard DSLR with the IR-block filter removed, thus restoring much of the original spectral range of the sensor. Second, a modified flash can be used that emits light over a wider spectral range than normal, which can be filtered to remove visible wavelengths. This dark flash can allow for the addition of light to the scene in such a way that it can be recorded by the camera, but not by a human's visual system. Using the dark flash, it is possible to illuminate a dimly lit scene without dazzling people present or disturbing other people in close proximity. Furthermore, it can allow for a fast shutter speed to be used, thus avoiding camera shake. People typically want images with colors that substantially match their own visual experience. However, this is generally not the case for images captured using heretofore available flash technologies.

Exemplary embodiments in accordance with the present disclosure can be regarded as a multi-spectral variation of the flash/no-flash technique introduced by Agrawal et al., *Removing photography artifacts using gradient projection and flash-exposure sampling*, ACM Transactions on Graphics (Proc. SIGGRAPH), 24, 828-835 (2005), Petschnigg et al., *Digital photography with flash and no-flash image pairs*, ACM Transactions on Graphics (Proc. SIGGRAPH) 23, 3, 664-672 (2004), and Eisemann et al., *Flash photography enhancement via intrinsic relighting*, ACM Transactions on Graphics (Proc. SIGGRAPH) 23, 673-678 (2004). Agrawal et al. 2005 focused on the removal of flash artifacts but did not apply their method to ambient images containing significant noise, unlike those described in Petschnigg et al., supra, and Eisemann et al., supra. The approaches described in the two latter publications are similar to one another in that they use a cross-bilateral (also known as joint-bilateral) filter and detail transfer. However, Petschnigg et al., supra, attempts to denoise the ambient image, adding detail from the flash, while Eisemann et al., supra, alter the flash image using ambient tones.

Bennett et al., *Multispectral bilateral video fusion*, IEEE Trans. Image Processing 16, 5, 1185-1194 (2007), describes how video captured in low-light conditions can be denoised using continuous IR illumination. However, they make use of temporal smoothing to achieve high quality results, something that is generally not possible in a photography setting. Wang, O., et al. *Video relighting using infrared illumination*, Computer Graphics Forum 27 (2008), describes, e.g., how IR illumination can be used to relight faces in well-lit scenes. Both of these approaches significantly differ from exemplary embodiments in accordance with the present disclosure in a number of ways: (i) they use complex optical bench based setups with twin cameras and beam-splitters as opposed to a single portable DSLR camera and temporally multiplex; (ii) both use IR alone rather than the near-UV and IR (for achieving high quality reconstructions); (iii) both rely on cross-bilateral filtering to combine the IR and visible signals, an approach which can have significant shortcomings. In contrast, disclosed herein is a principled mechanism for propagating information between spectral bands. This can be integrated into a unified cost function that combines the denoising and detail transfer mechanisms, treated separately in cross-bilateral filtering and related methods, such as is described in Farbman et al., *Edge-preserving decompositions for multi-scale tone and detail manipulation*, ACM Transactions on Graphics (Proc. SIGGRAPH) 27, 671-680 (2008).

Infra-red imaging has a history in areas such as astronomy and night-vision. In consumer photography the most prominent use can be considered to have been the Sony Nightshot where the IR-block filter can be switched out to use the near-IR part of the spectrum. The images are monochrome (with a greenish tint) and generally no attempt is made to restore natural colors to them. Other imaging approaches use Far-IR wavelengths to record the thermal signature of people or vehicles. However, this can require specialized optics and sensors and thus has limited relevance to consumer photography. Ultra-violet (UV) photography generally has received little attention, other than from flower photography enthusiasts (see, e.g., Rorslett, B., *Flowers in Ultraviolet*, available at http://www.naturfotograf.com/UV_flowers_list.html (last accessed Jan. 7, 2010)). Many flowers that can look plain to humans can have vibrant patterns under UV light to attract insects sensitive to these wavelengths.

Multi-spectral recording using visible wavelengths has been explored by several authors. Park et al., *Multispectral Imaging Using Multiplexed Illumination*, ICCV 1-8 (2007), describes the use multiplexed illumination via arrays of colored LEDs to recover spectral reflectance functions of the scene at video frame rates. Exemplary embodiments of the system, method and computer-accessible medium according to the present disclosure can be used in a similar manner for still scenes, being able to estimate the reflectance functions beyond the visible range. Mohan et al., *Agile spectrum imaging: Programmable wavelength modulation for cameras and projectors*, Computer Graphics Forum 27, 2, 709-717 (2008), describes use of a diffraction grating in conjunction with an LCD mask to give control over the color spectrum for applications including metamer detection and adaptive color primaries.

Processing of the flash/no-flash pair in accordance with the present disclosure exploits the relationships and/or correlations between nearby spectral bands. Most work on image priors can be considered as having focused on capturing spatial correlations within a band. For example, priors based on the heavy tailed distributions of image gradients have proven effective in a wide range of problems such as denoising (see, e.g., Portilla et al., *Image denoising using a scale mixture of Gaussians in the wavelet domain*, IEEE Trans. Image Processing 12, 11, 1338-1351 (2003), deblurring (see, e.g., Fergus et al., *Removing camera shake from a single photograph*, ACM Transactions on Graphics (Proc. SIGGRAPH) 25, 787-794 (2006)), separating reflections (see, e.g., Levin and Weiss, *User assisted separation of reflections from a single image using a sparsity prior*, IEEE Trans. Pattern Analysis and Machine Intelligence 29, 9, 1647-1654 (2007)). However, models that exploit dependencies between color channels tend to be less common. The K-SVD denoising approach of Aharon et al., *The KSVD: An algorithm for designing of overcomplete dictionaries for sparse representation*, IEEE Trans. Signal Processing 54, 11, 4311-4322 (2006), can do so by vector quantizing color patches. The fields-of-experts approach of Roth et al., *Fields of Experts: A Framework for Learning Image Priors*, CVPR, 2, 860-867 (2005) has also been extended to model color images (see, e.g., McAuley et al., *Learning high-order MRF priors of color images*, ICML 06, 617-624 (2006)) and uses color marginal filters. However, neither of these approaches explicitly model the interchannel correlations, unlike the exemplary system, method and computer accessible medium according to the present disclosure. Explicit spectral models are used in color constancy problems and joint spatial-spectral models have been proposed (see, e.g., Singh et al., *Exploiting spatial and spectral image regularities for color constancy*, Workshop on Statistical and Computational Theories of Vision (2003), and Chakrabarti et al., *Color constancy beyond bags of pixels*, CVPR, 1-6 (2008)) for this task, but these generally assume a noise-free image. Morris et al., *Statistics of infrared images*, CVPR, 1-7 (2007), describes measuring the spatial gradients of far IR images gathered with a specialized camera, demonstrating their similarity to those of visible light images.

Flash-based methods are generally not the only solution to taking pictures in low-light levels. Wide aperture lenses gather more light but are heavy and expensive, making them impractical for most photographers. Anti-shake hardware can be used to capture blur-free images at slow shutter speeds. These techniques can be combined with an exemplary approach in accordance with the present disclosure to extend performance to even lower light levels. Software-based deblurring techniques (see, e.g., Fergus et al., supra, and Jiaya, J., *Single image motion deblurring using transparency*, CVPR, 1-8 (2007)) can only cope with modest levels of blur and typically have artifacts in their output. Denoising techniques, such as described in, e.g., Tomasi et al., *Bilateral filtering for gray and color images*, ICCV, 839-846 (1998), and Portilla et al., supra, can have similar performance issues and cannot cope with the noise levels that can be addressed by certain exemplary embodiments disclosed herein. Joint denoising/deblurring techniques, such as that described in, e.g., Yuan et al., *Image deblurring with blurred/noisy image pairs*, ACM Transactions on Graphics (Proc. SIGGRAPH) 26, 1-10 (2007), may provide better performance but still require a problematic deconvolution operation, which can introduce artifacts. Methods that register and combine a stack of noisy images, such as described in, e.g., Telleen et al., *Synthetic shutter speed imaging*, Computer Graphics Forum 26, 3, 591-598 (2007), can have the inconvenience of needing to capture far more than two images. A visible flash can be made non-dazzling by using a diffuser and aiming at the ceiling. Such methods can work appropriately but can be limited to indoor settings with a relatively low ceiling of neutral color.

Natural image statistics are a powerful tool in image processing, computer vision and computational photography. Denoising (see, e.g., Portilla et al., supra), deblurring (see, e.g., Fergus et al., supra), transparency separation (see, e.g., Levin and Weiss, supra) and super-resolution (see, e.g., Tappen, M. F. et al., *Exploiting the sparse derivative prior for super-resolution and image demosaicing*, SCTV (2003)), are all tasks that can be inherently ill-posed. Priors based on natural image statistics can regularize these problems to yield quality results. However, digital cameras now have sensors that record images with tens of megapixels (MP), e.g., the latest Canon DSLRs have over 20 MP. Solving the above tasks for such images in a reasonable time frame (e.g., a few minutes or less), poses a significant challenge to existing algorithms. An exemplary problem can be addressed by the exemplary embodiments of the present disclosure, e.g., non-blind deconvolution, and can address very large images while still yielding high quality results.

Various deconvolution approaches can exist, varying substantially in their speed and sophistication. Simple filtering operations are fast but typically yield poor results. Most of the adequately-performing approaches solve globally for the corrected image, encouraging the marginal statistics of a set of filter outputs to match those of uncorrupted images, which can act as a prior to regularize the problem. For these methods, a trade-off can exist between accurately modeling the image statistics and being able to solve the ensuing optimization problem efficiently. If the marginal distributions can be assumed to be Gaussian, a closed-form solution exists in the frequency domain and FFTs can be used to recover the image very quickly. However, real-world images can typically have marginals that are non-Gaussian, and thus the output can often be of mediocre quality. One approach is to assume the marginals have a Laplacian distribution. This can allow a number of fast $l_1$ and related TV-norm methods, such as described in, e.g., L. Rudin et al., *Nonlinear total variation based noise removal algorithms*, Physica D 60, 259-268 (1992), and Wang, Y. et al., *A new alternating minimization algorithm for total variation image reconstruction*, SIAM J. Imaging Sciences 1, 3, 248-272 (2008), to be deployed, which can give appropriate results in a reasonable time.

However, studies of real-world images have shown the marginal distributions have significantly heavier tails than a Laplacian, being modeled by a hyper-Laplacian (see, e.g., Field, D., *What is the goal of sensory coding?*, Neural Computation 6, 559-601 (1994), Levin, Fergus, Durand and Freeman, *Image and depth from a conventional camera with a coded aperture*, ACM TOG (Proc. SIGGRAPH) 26, 3, 70 (2007) and Simoncelli et al., *Noise removal via Bayesian wavelet coring*, ICIP 379-382 (1996)). Although such priors can give appropriate quality results, they can typically be slower than methods that use either Gaussian or Laplacian priors. This can be a consequence of the problem becoming non-convex for hyper-Laplacians with $\alpha<1$, meaning that it is possible that many of the fast $l_1$ or $l_2$ tricks are no longer applicable. Instead, standard optimization methods such as conjugate gradient (CG) can be used. One variant that can work in practice is iteratively reweighted least squares (IRLS) as described in, e.g., Stewart, C. V., *Robust parameter estimation in computer vision*, SIAM Reviews 41, 3, 513-537 (1999), which can solve a series of weighted least squares problems with CG, each one an $l_2$ approximation to the non-convex problem at the current point. In both cases, typically hundreds of CG iterations can be used, each of which can involve an expensive convolution of the blur kernel with the current image estimate.

Hyper-Laplacian image priors have been used in a range of settings: super-resolution (see, e.g., Tappen et al., supra), transparency separation (see, e.g., Levin and Weiss, supra) and motion deblurring (see, e.g., Levin, A., *Blind motion deblurring using image statistics*, NIPS (2006)). Work that can be considered relevant to certain exemplary embodiments of the present disclosure, such as that described in, e.g., Levin, Fergus, Durand and Freeman, supra, and Joshi et al., *Image deblurring and denoising using color priors*, CVPR (2009), has been applied to non-blind deconvolution problems using IRLS in an attempt to solve the deblurred image problem. Other types of sparse image priors include, e.g., Gaussian Scale Mixtures (GSM) (see, e.g., Wainwright et al., *Scale mixtures of Gaussians and the statistics of natural images*, NIPS 855-861 (1999)), which have been used for image deblurring (see, e.g., Fergus et al., supra), denoising (see, e.g., Portilla et al., supra) and student-T distributions for denoising (see, e.g., Welling et al., *Learning sparse topographic representations with products of student-t distributions*, NIPS (2002) and Roth et al., supra). With the exception of Portilla et al., supra, these methods generally use CG and thus can be slow.

The alternating minimization procedure that can be adopted by certain exemplary embodiments in accordance with the present disclosure can be a technique known as half-quadratic splitting (see, e.g., Geman and Reynolds, *Constrained restoration and recovery of discontinuities*, PAMI 14, 3, 367-383 (1992) and Geman and Yang, *Nonlinear image recovery with half-quadratic regularization*, PAMI 4, 932-946 (1995)). Recently, Wang, Y. et al., supra, showed that it could be used with a total-variation (TV) norm to deconvolve images. Exemplary embodiments according to the present disclosure can be considered to be related to this work: e.g., certain exemplary embodiments can also use a half-quadratic minimization, but the per-pixel sub-problem is quite different. With the TV norm, the problem can be solved with a straightforward shrinkage operation. As a consequence of using a sparse prior, the problem can be non-convex. Accordingly, solving the problem efficiently is one of the objectives provided by exemplary embodiments according to the present disclosure.

Described in Chartrand, R., *Fast algorithms for nonconvex compressive sensing: Mri reconstruction from very few data*, IEEE International Symposium on Biomedical Imaging (2009) and Chartrand and Staneva, *Restricted isometry properties and nonconvex compressive sensing*, Inverse Problems 24, 1-14 (2008), for example, is a non-convex compressive sensing procedure, in which the usual $l_1$ norm on the signal to be recovered is replaced with a $l_p$ quasi-norm, where $p<1$. A splitting scheme can be used, resulting in a non-convex per-pixel sub-problem. To solve this, a Huber approximation (see, e.g., Chartrand, R., supra) to the quasi-norm can be used, which can allow for the derivation of a generalized shrinkage operator to solve the sub-problem. However, this approximates the original sub-problem, unlike exemplary embodiments in accordance with the present disclosure.

SUMMARY OF EXEMPLARY EMBODIMENTS

At least one of the objects of various exemplary embodiments of the present disclosure is to overcome the deficiencies commonly associated with the prior art as discussed above, and provide exemplary embodiments of computer-accessible medium, methods and systems for dark flash photography.

For example, described herein is an exemplary embodiment of an apparatus for providing illumination and obtaining an image, which can include, e.g., a first arrangement that can be configured to emit a flash of light including ultra-violet light and/or infra-red light to illuminate a scene and/or one or more subjects, and a second arrangement that can be configured to obtain an image of the illuminated scene and/or one or more subject. A duration of time and/or an intensity level of the flash can be selected so that wavelengths of the flash can be substantially invisible to a human eye, for example. According to certain exemplary embodiments of the present disclosure, at least, e.g., approximately 90% of the light can include ultra-violet light and/or infra-red light; while, in accordance with some exemplary embodiments, at least, e.g., approximately 95% of the light can include ultra-violet light and/or infra-red light.

It is possible that the visibility of the wavelengths of the flash perceived by the human eye can be between, e.g., approximately 200 times less than the visibility of wavelengths of a standard flash of light having substantially the same amount of energy as the flash. A standard flash can include, e.g., light having a substantially even distribution of wavelengths of between approximately 400 nanometers (nm) and approximately 700 nm, where a majority of the light of the standard flash has a wavelength of between approximately 400 nm and approximately 700 nm, for example.

Also described herein, for example, is an exemplary embodiment of an apparatus for providing illumination that includes an arrangement configured to emit light that can include ultra-violet light and infra-red light. A majority of the light can be ultra-violet light and/or infra-red light. According to certain exemplary embodiments, the arrangement can be further configured to emit near ultra-violet light, ultra-violet light having a wavelength of between approximately 360 nm and approximately 400 nm, and/or infra-red light having a wavelength of between approximately 700 nm and approximately 800 nm, for example.

According to certain exemplary embodiments of the present disclosure, an exemplary apparatus can include a further arrangement configured to obtain an image. The image can be, e.g., of a scene and/or one or more subjects illuminated by light including ultra-violet light and infra-red light. A majority of the illuminating light can be ultra-violet light and/or infra-red light. According to certain exemplary embodiments, the majority can include, e.g., at least approximately 90% of the illuminating light and/or at least approximately 95% of the illuminating light. According to some exemplary embodiments, the illuminating light can, e.g., consist of ultra-violet light and infra-red light.

In accordance with some exemplary embodiments of the present disclosure, the illuminating light can include, e.g., near ultra-violet light, ultra-violet light having a wavelength of between approximately 360 nm and approximately 400 nm, and/or infra-red light having a wavelength of between approximately 700 nm and approximately 800 nm, for example. Additionally, according to some exemplary embodiments, the further arrangement can include attributes and be configured to emit ultra-violet light and/or infra-red light having wavelengths that are selected based on the attributes.

Also described herein, for example, is an exemplary embodiment of a process for dark flash photography, which can include, e.g., obtaining a first image of a scene and/or one or more subjects illuminated by light including ambient light, obtaining a second image of the scene and/or one or more subjects illuminated with light including ultra-violet light and infra-red light, and, using an apparatus, generating a third image based on the first image and the second image. According to some exemplary embodiments of the present disclosure, the process can further include displaying and/or storing the third image in a storage arrangement in a user-accessible format and/or a user-readable format, for example. The ambient and/or visible light can include light having a wavelength of, e.g., between approximately 400 nm and approximately 700 nm.

Additionally described herein, for example, is an exemplary embodiment of a computer-accessible medium having stored thereon computer executable instructions for dark flash photography. For example, when the executable instructions are executed by a processing arrangement, the processing arrangement can be configured to perform procedures including, e.g., (a) obtaining at least two images, where a first image of the images can be obtained using a dark flash illumination procedure and a second image of the images can be obtained using an ambient illumination, (b) determining a relationship between spectral bands corresponding to the images, (c) identifying noise associated with the second image based on the relationship, and removing or reducing the noise, and (d) generating a further image from the images with the noise removed or reduced, where the further image can have a higher quality than the first and/or second images. According to some exemplary embodiments of the present disclosure, the relationships between spectral bands corresponding to the images can include one or more correlations between spectral bands corresponding to the images. The processing arrangement can be further configured to, e.g., utilize an edge structure of the first image to remove or reduce the noise in accordance with some exemplary embodiments of the present disclosure, for example.

Also described herein, for example, is an exemplary embodiment of a process for dark flash photography, including, e.g., (a) obtaining at least two images, where a first image of the images can be obtained using a dark flash illumination procedure and a second image of the images can be obtained using an ambient illumination, (b) determining a relationship between spectral bands corresponding to the images, (c) identifying noise associated with the second image based on the relationship, and removing or reducing the noise, and (d) generating a further image from the images with the noise removed or reduced, where the further image can have a higher quality than the first and/or second images. According to some exemplary embodiments of the present disclosure, the process can further include displaying and/or storing the third image in a storage arrangement in a user-accessible format and/or a user-readable format, for example.

In addition, described herein, for example, is an exemplary embodiment of a system for dark flash photography, including a processing arrangement which, when executed, can be configured to e.g., (a) obtain at least two images, where a first image of the images can be obtained using a dark flash illumination procedure and a second image of the images can be obtained using an ambient illumination; (b) determine a relationship between spectral bands corresponding to the images; (c) identify noise associated with the second image based on the relationship, and remove or reduce the noise; and (d) generate a further image from the images with the noise removed or reduced, where the further image can have a higher quality than the first and/or second images.

Further described herein, for example, is an exemplary embodiment of a computer-accessible medium having stored thereon computer executable instructions for denoising and/or non-blind deconvolution of an output. For example, when the executable instructions are executed by a processing arrangement, the processing arrangement can be configured to perform procedures including, e.g., (a) obtaining at least one prior information that can have a hyper-Laplacian form, (b) selecting a set of auxiliary variables that can include auxiliary variables corresponding to individual data points of the output, and (c) denoising and/or deconvoluting at least a portion of the output using a continuation procedure that can alternate between executing two sub-procedures in successive iterations to increase the strength of at least one parameter linking the two sub-procedures in each iteration.

The continuation procedure can include, e.g., (i) using a first sub-procedure, updating at least one of the data points of the output while maintaining the auxiliary variables as constant, and (ii) using a second sub-procedure, updating at least one of the auxiliary variables while maintaining the data points of the output as constant. According to some exemplary embodiments of the present disclosure, the processing arrangement can be further configured, when executing the instructions, to, e.g., utilize a Fast Fourier transform to perform the first sub-procedure. The processing arrangement can be further configured, when executing the instructions, to, e.g., utilize a lookup-table to perform the second sub-procedure in accordance with some exemplary embodiments of the present disclosure. The lookup-table can include, e.g., precomputed values stored in a storage arrangement. The processing arrangement can be further configured, when executing the instructions, to, e.g., repeat the performance of the continuation procedure until the output is at least one of substantially denoised or substantially deconvoluted and/or denoised or deconvoluted in accordance with predetermined criteria.

In accordance with some exemplary embodiments of the present disclosure, the output can be or include an image, and the prior information can be or include image prior information, for example.

These and other objects, features and advantages of the present disclosure will become apparent upon reading the following detailed description of exemplary embodiments of the invention, when taken in conjunction with the appended claims.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 2($b$) is an exemplary graph illustrating irradiance from an the exemplary dark flash;

FIG. 2($c$) is an exemplary graph illustrating exemplary spectrum received by the exemplary camera sensor when imaging a white surface illuminated by the exemplary dark flash;

FIG. 3($b$) is an illustration of an exemplary perceived brightness of an exemplary dark flash and a visible flash that provides a comparable camera exposure;

FIG. 3($c$) is an exemplary Macbeth color chart captured with a pair of exemplary flash images, separated out into five spectral bands;

FIG. 15($b$) is a graph of an exemplary empirical distribution of gradients in the scene, along with a Gaussian fit, a Laplacian fit and a hyper-Laplacian;

Figure 1:
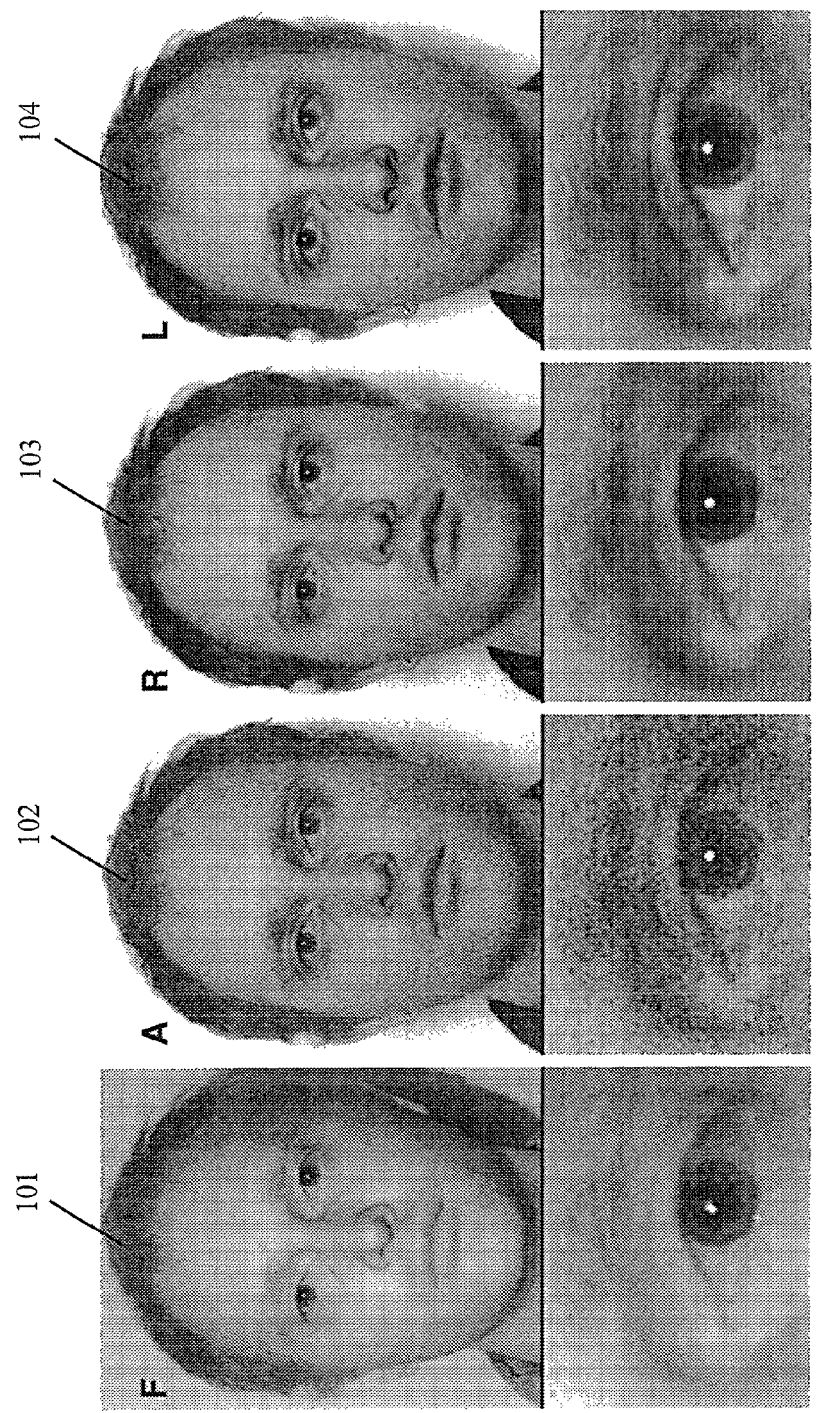
FIG. 1 is a set of exemplary images captured at a blur-free shutter speed.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described exemplary embodiments without departing from the true scope and spirit of the subject disclosure as defined by the appended claims.

DETAILED DESCRIPTION OF EXEMPLARY EMBODIMENTS

According to certain exemplary embodiments of the present disclosure, exemplary computer-accessible medium, methods and systems can be provided for facilitating dark flash photography.

To overcome certain problems described above, disclosed and described herein, for example, is an exemplary embodiment of an apparatus for providing illumination and obtaining an image, which can include, e.g., a first arrangement that can be configured to emit a flash of light including ultra-violet light and/or infra-red light to illuminate a scene and/or one or more subjects, and a second arrangement that can be configured to obtain an image of the illuminated scene and/or one or more subject. A duration of time and/or an intensity level of the flash can be selected so that wavelengths of the flash can be substantially invisible to a human eye while being able to be detected, received and processed by the exemplary second arrangement. An exemplary second arrangement can be and/or include an exemplary camera sensor capable of and/or configured to detect and receive light having wavelengths that are substantially invisible to the human eye, e.g., outside of the visible range between approximately 400 nanometers (nm) and approximately 700 nm, for example. A majority of the light can be ultra-violet light and/or infra-red light. According to certain exemplary embodiments, the majority can be a super-majority and/or include, e.g., at least approximately 80% of the light, at least approximately 90% of the light, at least approximately 95% of the light and/or at least approximately 99% of the light, for example.

It is possible that the visibility of the wavelengths of the flash perceived by the human eye can be between, e.g., approximately 100 times and approximately 300 times less than the visibility of wavelengths of a standard flash of light having substantially the same amount of energy as the flash. For example, according to some exemplary embodiments of the present disclosure, it is possible that the visibility of the wavelengths of the flash perceived by the human eye can be, e.g., approximately 200 times less than the visibility of wavelengths of a standard flash of light having substantially the same amount of energy as the flash. According to other exemplary embodiments, it is possible that the visibility of the wavelengths of the flash perceived by the human eye can be, e.g., greater than approximately 300 times less than the visibility of wavelengths of a standard flash of light having substantially the same amount of energy as the flash.

A standard flash can include, e.g., light having a substantially even distribution of wavelengths of between approximately 400 nm and approximately 700 nm, for example, where a majority of the light of the standard flash has a wavelength of between approximately 400 nm and approximately 700 nm. The majority can be a super-majority and/or include, e.g., at least approximately 80% of the light, at least approximately 90% of the light, at least approximately 95% of the light and/or at least approximately 99% of the light, for example.

For example, according to exemplary embodiments of the present disclosure, a pair of images can be acquired in the manner of flash/no-flash photography, one using the dark flash and the second using ambient illumination alone. For the latter to be blur-free, a fast shutter speed can be used, resulting in high noise levels in dim light (e.g., low light level conditions). If the non-visible and visible channels are close in wavelength, one or more strong relationships can exist between them. Such relationship(s) can be and/or include, e.g., a correlation, coherence, mutual information, common components, etc. Disclosed and described herein is, e.g., a novel type of constraint that can exploit the relationships between spectral bands, such as, the correlation between spectral bands. For example, using this exemplary constraint, the edge structure of the dark flash image can be used to remove the noise from the ambient image, yielding a high quality result that lacks the shadow and specularity artifacts that can typically be present in the flash image. An exemplary procedure for exploiting the relationships between images (and/or the spectral bands thereof) can include, for example, one or more procedures which can be implemented using one or more computational methods and systems, such as, e.g., correlation, coherence, mutual information, principal components analysis, independent components analysis, canonical correlation, general linear model, etc.

Also disclosed and described herein are exemplary procedures of how exemplary camera and flash hardware and spectral constraints can be used in a range of additional applications, including, e.g., inferring spectral reflectance functions of materials in the scene and denoising individual color channels of images captured with standard cameras.

Further disclosed and described herein is an exemplary deconvolution approach that is several orders of magnitude faster than existing techniques that use hyper-Laplacian priors. An alternating minimization procedure can be used where one of the two phases is a non-convex problem that is separable over pixels. This per-pixel sub-problem can be solved with a lookup table (LUT). Alternatively, for two specific values of $\alpha$, $\frac{1}{2}$ and $\frac{2}{3}$, an analytic solution can be found by finding the roots of a cubic and quartic polynomial, respectively. According to exemplary embodiments of the present disclosure (using, e.g., either LUTs or analytic formulae) it is possible to deconvolve a 1 megapixel image in less than approximately 3 seconds, achieving comparable quality to existing methods such as iteratively reweighted least squares (IRLS) that can take approximately 20 minutes to complete. Furthermore, exemplary procedures in accordance with the exemplary embodiments of the present disclosure can be relatively general and thus easily be extended to related image processing problems beyond the deconvolution application described herein for example.

Efficient exemplary procedures are also disclosed herein for non-blind deconvolution of images using a hyper-Laplacian image prior for $0<\alpha\leq1$. Exemplary algorithm uses an alternating minimization scheme where the non-convex part of the problem is solved in one phase, followed by a quadratic phase which can be efficiently solved in the frequency domain using FFTs. Exemplary embodiments according to the present disclosure can focus on, e.g., the first phase where at each pixel it is possible to solve a non-convex separable minimization. Two exemplary approaches to solving this sub-problem are provided. The first uses a lookup table (LUT); the second is an analytic approach specific to two values of $\alpha$. For $\alpha=\frac{1}{2}$ the global minima can be determined by finding the roots of a cubic polynomial analytically. In the $\alpha=\frac{2}{3}$ case, the polynomial is a quartic whose roots can also be found efficiently in closed-form. Both IRLS and exemplary embodiments according to the present disclosure can solve a series of approximations to the original problem. However, in exemplary methods according to the present disclosure, each approximation can be solved by alternating between the two phases above a few times, thus avoiding the expensive CG descent used by IRLS. This allows exemplary embodiments according to the present disclosure to operate several orders of magnitude faster. Although exemplary embodiments according to the present disclosure focus on the problem of non-blind deconvolution, in view of the teaches disclosed herein, it would be straightforward to having ordinary skill in the art to adapt certain exemplary embodiments according to the present disclosure to other related problems, such as, e.g., denoising or super-resolution.

As described herein, a pair of images can be received that are taken at two points in time, e.g., t1 and t2. For example, a pair of images can be captured in relatively quick succession. The first image can be taken with the dark flash on, and the exposure can be of a duration which can be relatively short, e.g., $\frac{1}{40}$ seconds or less. The second image can be taken right after the first without the dark flash, for example. In the case of low ambient light levels in the scene, such an image may be, e.g., noisy and blurry. The level of noise and blur may depend on, e.g., the exposure time of this image. As the exposure time is increased, the image may become more blurry, and may become less noisy. Decreasing the exposure time can have the opposite effect: the blur can be reduced, but noise levels may be increased. The blurring in the ambient image can be due to, e.g., the motion of the camera during the long exposure. This blurring function, which can also be called the blur kernel, can be unknown.

According to some exemplary embodiments in accordance with the present disclosure, the unknown blur kernel can be estimated, and further the unblurred version of the ambient image can be estimated. According to some exemplary embodiments of the present disclosure, this blind deblurring problem can be solved in two exemplary procedures. In the following example, the flash image can be referred to as F and the ambient (non-flash) image is referred to as A.

The blurring in A, if any, can be assumed to be caused, e.g., due to camera shake. The blur kernel k can be estimated in a number of ways, for example. One exemplary way is to estimate k by solving the problem described below. In this example, $F_j$ and $A_j$ refer to an individual channel j, where j can be, e.g., 1, 2, 3, for red, green and blue channels respectively:

$$\underset{k}{\operatorname{argmin}} \lambda \|F_j \oplus k - A_j\|^2 + \|k\|^2 \quad (1)$$

where $\oplus$ is the convolution operator, and $\lambda$ is a regularization parameter. Another exemplary procedure and/or method to estimate the blur kernel is to solve the following exemplary problem:

$$\underset{k}{\operatorname{argmin}} \lambda \|\nabla F_j \oplus k - \nabla A_j\|^2 + \|k\|^2 \quad (2)$$

where $\nabla$ refers to the gradient of the image. Following the estimation of k, the estimation of k can be normalized so that, e.g., the entries of k sum to 1. Any of the three exemplary channels j can be used for the estimation of k. According to some exemplary embodiments, it may be preferable to use the exemplary green channel (e.g., j=2).

When k is estimated, A can be deblurred and denoised to create a substantially noise-free and blur-free image with the substantially correct colors. The gradient information from the clean flash image F can also be used according to some exemplary embodiments of the present disclosure. The reconstructed image can be called, e.g., R. Three substantially clean channels $R_j$ can be recovered by utilizing the color information in $A_j$ and the gradient information in $F_j$. According to certain exemplary embodiments of the present disclosure, the following exemplary optimization problem can be solved:

$$\underset{R_j}{\operatorname{argmin}} \sum_p \lambda ((R_j \oplus k)(p) - A_j(p))^2 + \quad (3)$$

$$\kappa |R_j(p)|^\alpha + |\nabla R_j(p) - \nabla F_1(p)|^\alpha + |\nabla R_j(p) - \nabla F_3(p)|^\alpha$$

where p refers to the pixels in the channel, and can usually be ≤1. In this example, k represents the discovered blur kernel from the previous step. This exemplary optimization problem can be solved with the substantially fast method as described herein below.

Currently, most flashes can be considered to be relatively fast, e.g., in the range of 1/500 seconds to 1/1000 seconds. To provide sufficient and/or enough illumination to a scene, the flash power typically can be selected to be high enough so that significant energy can be delivered in this relatively short time frame. To make the dark flash less dazzling, according to certain exemplary embodiments of the present disclosure, the duration of the flash can be reduced (e.g., slowed down) to approximately 1/100 of a second, with a corresponding decrease in the flash power if preferred.

As described herein, an exemplary fast numerical procedure, exemplary method and/or scheme is disclosed that can be used to solve problems of the type associated with the exemplary optimization problem described above, which can be nonconvex when, e.g., $\alpha<1$ and can be typically hard (e.g., difficult and/or slow) to solve. Described herein is an exemplary splitting procedure and/or scheme that can reformulate the exemplary optimization problem described above by exemplary Equation 3 into two exemplary subproblems, which can be called, e.g., the "w sub-problem" and the "u sub-problem" (see, e.g., Chartrand, R., supra). As described herein, the exemplary w sub-problem can be solved analytically for certain values of the exemplary exponent $\alpha$ in the exemplary optimization problem described above, specifically, e.g., $\alpha=\frac{1}{2}$ and $\alpha=\frac{2}{3}$. Numerically, according to certain exemplary embodiments, an exemplary Look Up Table (LUT) can be used that can directly encode the exemplary substantially optimal solution of the exemplary w sub-problem for a wide range of exemplary values, and use, e.g., linear interpolation to determine the exemplary solution for entries that are not in the LUT. This exemplary procedure and/or scheme can be effective because it can be known a-priori the range of exemplary values for the different variables in the exemplary w sub-problem. The exemplary LUT-based procedure can be relatively very fast as compared to other potential related procedures, and can enable and/or allow the exemplary optimization problem described above for any $\alpha$ value to be solved.

FIG. 1, for example, shows certain exemplary images 101, 102 that were captured at a blur-free shutter speed. Image 101 was captured using a multi-spectral flash (F), while image 102 using ambient illumination (A) which in this exemplary case is 1/100th of that which can be typically associated for a correct and/or optimal exposure. Images 101 and 102 were combined to provide an output image 103 (R), which can be of comparable quality to a reference long exposure show, as shown by image 104 (L). As can be seen in FIG. 1, an exemplary camera and flash system in accordance with the present disclosure can provide dazzle-free photography by, e.g., substantially or completely hiding the flash in the non-visible spectrum.

Exemplary Dark Flash Hardware

In accordance with certain exemplary embodiments of the present disclosure, the images can be captured, e.g., one with an exemplary dark flash (F) and another using ambient lighting alone (A). The pixel value p in channel j of image F can depend on three terms: e.g., the spectral response of each camera channel $C_j(\lambda)$ at wavelength $\lambda$, the illumination spectrum of the dark flash $I^f(\lambda)$, and the surface reflectance function $S(p, \lambda)$ at the point in the scene. These can combine in a linear fashion:

$$F_j(p) \int C_j(\lambda) I^f(\lambda) S(p,\lambda) d\lambda \quad (4)$$

with j={1, 2, 3} being the index of the camera channel. Even illumination can be presumed (e.g., $I^f(\lambda)$ does not depend on p). The ambient image A can be formed in a similar fashion, using illumination $I^a(\lambda)$ which can scale with the exposure interval. $A_1$, $A_2$ and $A_3$ can record red, green and blue wavelengths, respectively, under typical illumination. Through the choice of flash and camera, $I^f(\lambda)$ and the channel sensitivities $C_j(\lambda)$ can be controlled.

In accordance with certain exemplary embodiments of the present disclosure, it can be preferable to use off-the-shelf consumer hardware where possible to minimize the costs of the system and make it relatively easily reproducible. For example, a camera that can be used is, e.g., the Fuji IS Pro, which has been marketed for applications involving UV and IR since it lacks an IR sensor filter. A flash can be, e.g., the Nikon SB-14UV. Both the camera and the flash can be equipped with carefully selected filters (as described herein below, for example) that shape both $F(\lambda)$ and $C_j(\lambda)$ in accordance with some exemplary embodiments of the present disclosure. These filters can remain in place for both shots, thus the pair of images can be taken in quick succession, limited by the 3 frames/second rate of the camera, for example. According to certain exemplary embodiments, an IR-block filter covering the sensor can be removed temporarily by, e.g., utilizing a sliding mechanism. The flash can be used at full power for all shots, with the cycle time being sufficiently long that it does not fire for the second shot, giving an image with ambient illumination alone. Systems in accordance with exemplary embodiments of the present disclosure can be no more complex to operate than, e.g., a standard DSLR.

Figure 2:
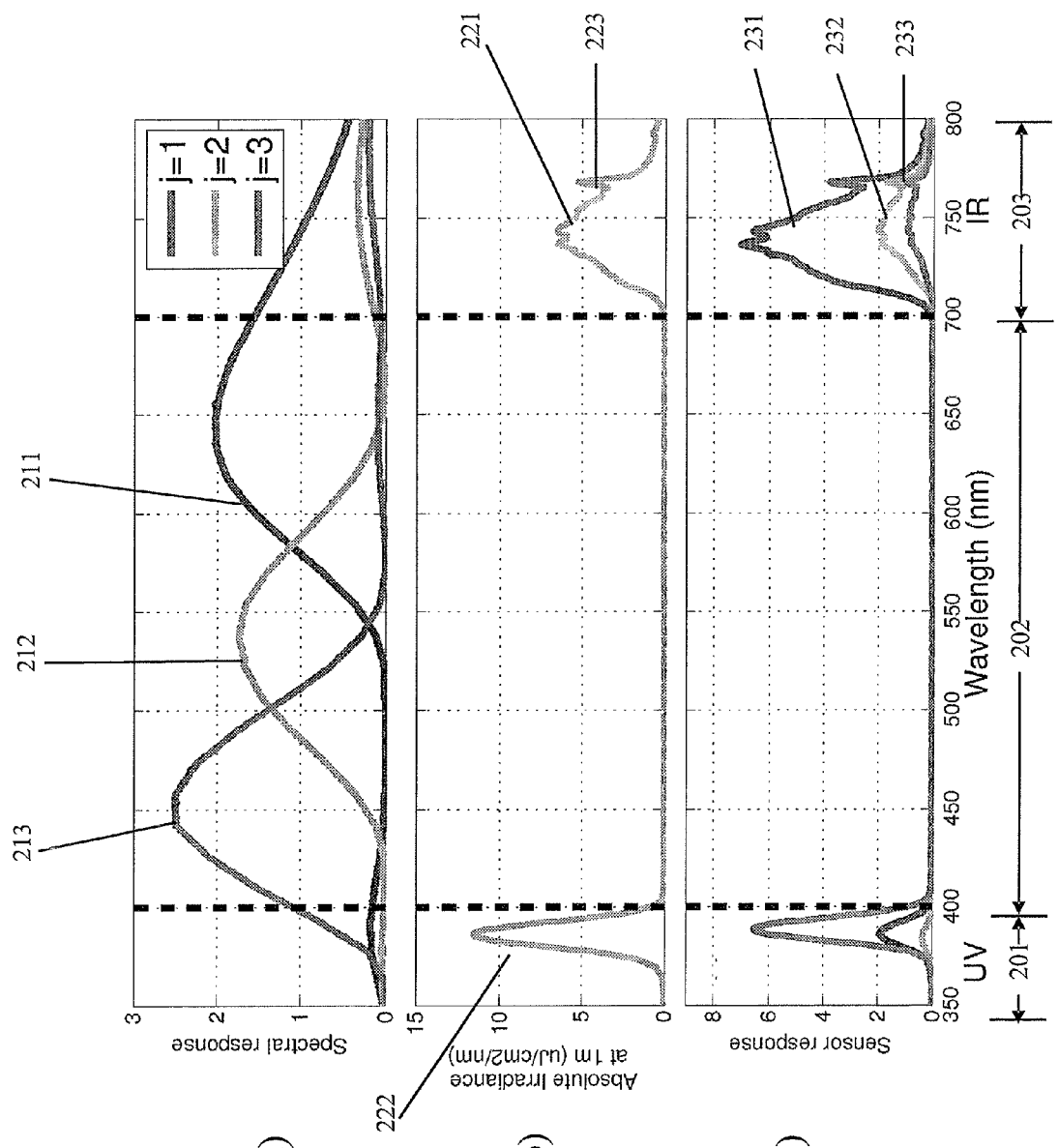
FIG. 2($a$) is an exemplary graph illustrating exemplary spectral response curves for each of an exemplary camera's three color channels.

An exemplary form of $F(\lambda)$ and how it can be recorded by a camera while remaining largely invisible to humans in accordance with the present disclosure is described with reference to FIG. 2.

FIG. 2(a) shows an exemplary graph illustrating spectral response curves $C_j(\lambda)$, j={1, 2, 3} for each of an exemplary camera's three color channels, as depicted by curves 211, 212, 213. As shown, with no IR sensor filter, the responses can extend considerably beyond the visible range 202 of approximately 400-700 nm.

FIG. 2(b) shows an exemplary graph illustrating irradiance 1 m from the dark flash $F(\lambda)$. The spectrum of the exemplary dark flash $F(\lambda)$ 221 is shown to have two distinct emission lobes 222, 223, both just outside the visible range 202. The first 222, consisting of UV light, couples with the small part of channel j=3's response extending below approximately 400 nm in region 201. The second lobe 223 in the IR region 203 between approximately 700 and 800 nm is picked up by channel j=1 which can respond relatively strongly. Thus, certain exemplary embodiments of dark flash can allow the recording of two independent measurements (e.g., 222, 223) at each location in a scene within a single image: one in UV 201 recorded in $F_3$, the other in IR 203 recorded in $F_1$.

FIG. 2(c) shows an exemplary graph illustrating exemplary spectrum received by the exemplary camera sensor when imaging a white surface ($S(p, \lambda)=1$) illuminated by the dark flash. The curves 231, 232, 233 are the product of those shown in Figures (a) and (b). The recorded pixel values for the three channels are the integrals of these curves, as calculated in Equation 4, described herein below). As can be seen, under the exemplary dark flash embodiment: no channel recorded in the visible range 202. Rather, as illustrated by curve 233, channel j=3 measured in the UV range and, as illustrated by curve 231, channel j=1 responded to IR wavelengths.

In accordance with some exemplary embodiments of the present disclosure, the flash/no-flash images can capture the scene at 5 different spectral bands, assuming the ambient illumination is dim compared to the output of the flash: 1. UV (approximately 370-400 nm) in $F_3$; 2. Blue (approximately 400-500 nm) in $A_3$; 3. Green (approximately 500-600 nm) in $A_2$; 4. Red (approximately 600-700 nm) in $A_1$ and 5. IR (approximately 700-800 nm), recorded in $F_1$.

FIG. 3(a) shows an exemplary photo of an exemplary camera 311 and dark flash system 312 in accordance with the present disclosure. FIG. 3(b) illustrates the perceived brightness of an exemplary dark flash 321 and a visible flash 322 that provides a comparable camera exposure. To capture them in a single image, the visible flash was attenuated by a factor of approximately 220 using exemplary neutral density filters. Without these filters, the dark flash may not be visible in a non-saturated 8-bit image. FIG. 3(c) is an exemplary Macbeth color chart captured with a pair of exemplary flash images (visible 331 and dark 332), separated out into the five spectral bands described above. See, e.g., UV 341 (approximately 370-400 nm) in $F_3$, Blue 342 (approximately 400-500 nm) in $A_3$, Green 343 (approximately 500-600 nm) in $A_2$, Red 344 (approximately 600-700 nm) in $A_1$ and IR 345 (approximately 700-800 nm) recorded in $F_1$. Subplot 346 shows the UV band with a UV-block filter attached to the camera that has a relatively sharp cut-off at approximately 400 nm. The low intensities in this band show that the exemplary camera is genuinely recording UV light, not blue light from fluorescence caused by the UV part of the flash, for example.

For comparison purposes, a standard visible flash whose power can be adjusted to give comparable camera exposure to the dark flash was used. FIG. 3(b) shows a relative perceived brightness of the dark and visible flashes by capturing them using a standard DSLR whose spectral response can be close to that of, e.g., human eyes (thus the brightness in the image generally corresponds to human perception). A quantitative analysis of their relative brightness is described further herein below.

With respect to safety issues, referring back to FIG. 2(b), exemplary embodiments of dark flash can emit energy just outside the visible wavelength range, centered approximately 380 nm with negligible energy below approximately 360 nm or above approximately 400 nm (until the exemplary IR lobe at approximately 700 nm). The potential health hazard posed by UV light can strongly depend on the wavelength. For example, those close to the visible range (e.g., approximately 400 nm) are generally orders of magnitude safer than the shorter wavelength components of sunlight. Exemplary embodiments of dark flash in accordance with the present disclosure can be relatively very close to the visible range, even closer than, e.g., blacklights that can be found in public establishments such as bars and nightclubs, for example, which blacklights can have a broader spectral width centered at approximately 360 nm. In the United States of America, acknowledged regulations regarding the safe daily exposure to UV light are provided in the Threshold Limit Values (TLV) booklet, published by the ACGIH (TLVs 2001).

According to certain exemplary embodiments of the present disclosure, the absolute spectral irradiance of the exemplary flash can be carefully measured using a spectrometer. Using the TLV tables, the approximate maximum safe number of flashes per day can be computed, which can be, e.g., approximately 130,000 at approximately 1 m from the flash. For example, if approximately 30 minutes outside in the sun results in the maximum permissible UV dose on a bright summer day, then each flash can be equivalent to being outside for approximately 1/100th second. Thus, exemplary embodiments of dark flash can likely pose no significant safety hazard. Further details of these calculations are provided herein below.

Exemplary Dark Flash Processing

An exemplary images, F and A can be captured using a shutter speed sufficient to avoid camera shake. Assuming that the ambient illumination is weak, A will typically be very noisy and the illumination in F will be dominated by the dark flash $F(\lambda)$. An exemplary image R can be sought having edges that are close to those in F and whose intensities are close to a denoised version of A, which should be similar to a long-exposure shot of the exemplary scene L, for example.

Standard approaches to denoising typically use spatial priors that can enforce sparsity on image gradients (see, e.g., Portilla et al., supra). In the flash/no flash scenario, F can contain high-frequency details that can assist the denoising process. But unlike conventional flash/no-flash photography, exemplary dark flash and ambient illuminations $I^f(\lambda)$ and $I_a(\lambda)$ are virtually non-overlapping, thus the colors in F can be quite different to those in the ambient image A or the long-exposure L. In accordance with exemplary embodiments of the present disclosure, a solution that uses the strong correlations between color channels as a constraint in an optimization scheme which computes R from A and F can be used.

Exemplary Spectral Constraints

Figure 3:
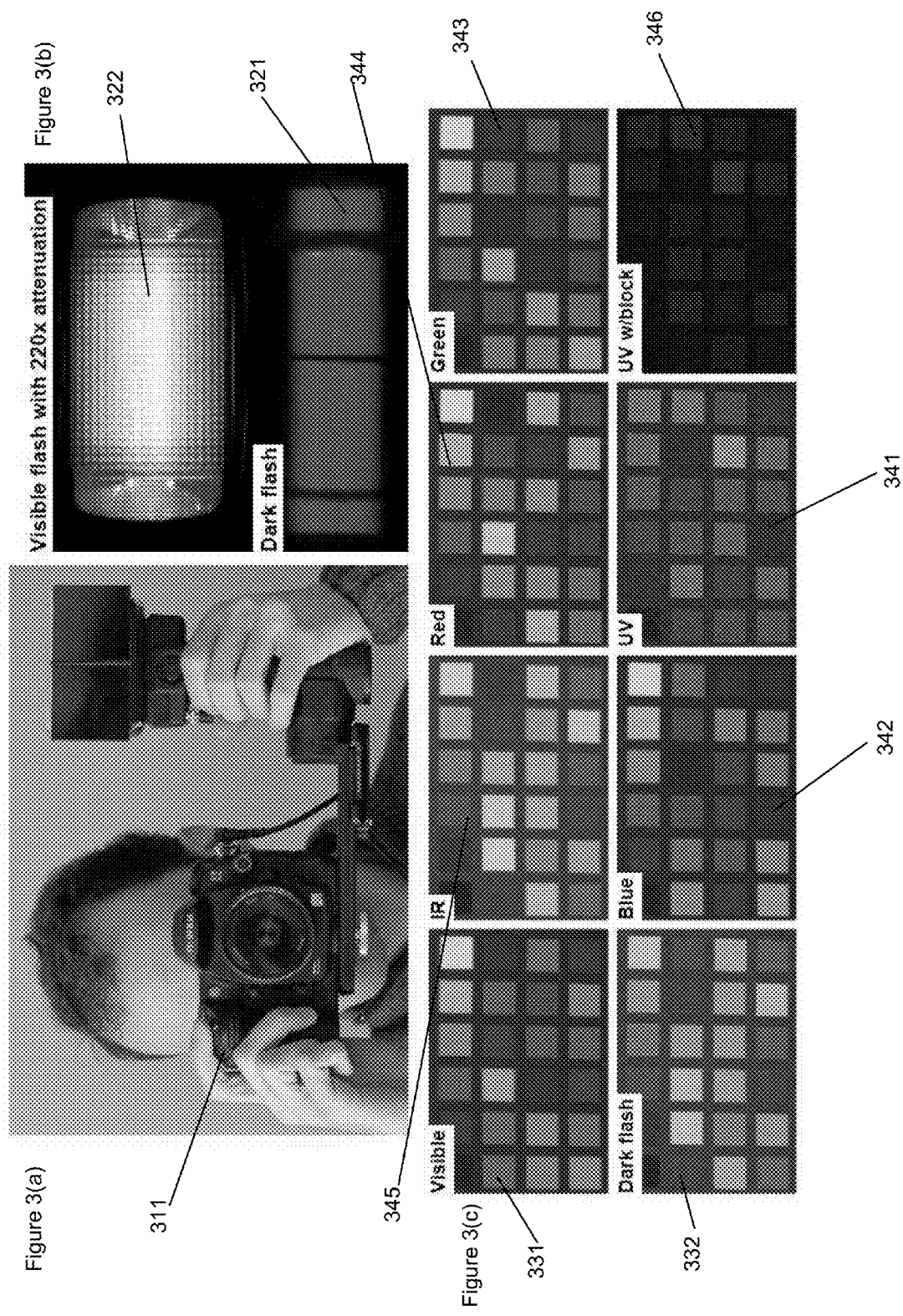
FIG. 3($a$) is a photograph of an exemplary camera and dark flash system.
Figure 4:
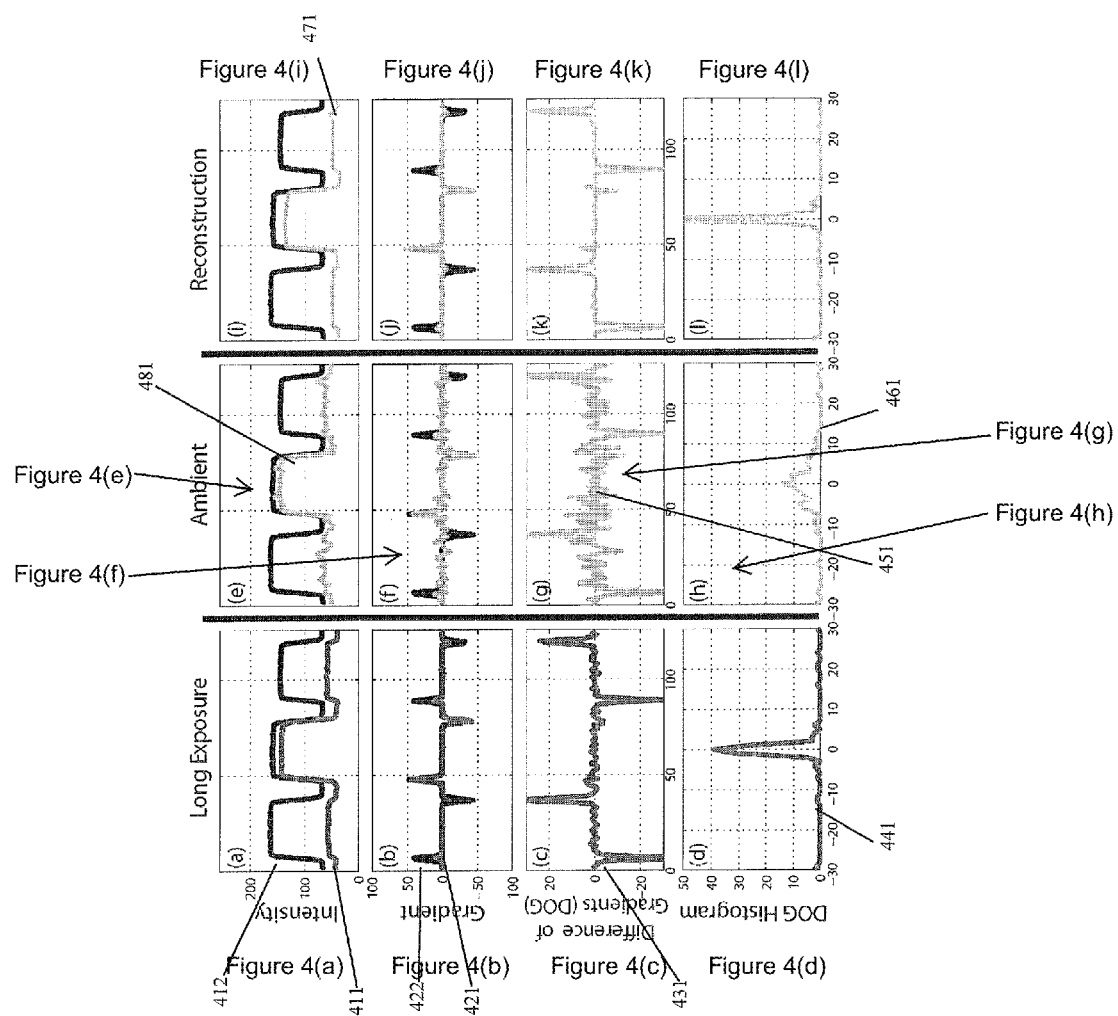
FIG. 4($a$)-4($l$) are exemplary graphs of exemplary spectral constraints in accordance with the present disclosure.

FIGS. 4(a)-4(l) show 1-D exemplary graphs of the spectral constraints in accordance with the present disclosure, using a scan line across 3 squares in the color chart of FIG. 3. The 1-D example in FIG. 4 shows a scanline across 3 squares in the exemplary color chart from FIG. 3. FIG. 4(a) shows the intensities from the red channel 411 of a long exposure shot ($L_1$) and IR 412 from an exemplary embodiment of the dark flash ($F_1$). Although the intensities are shown as being different, the edges can be aligned since the spectral reflectance at red and IR wavelengths can be correlated with one another. The alignment of the edges is apparent in FIG. 4(b) where the exemplary gradients 421, 422 along the scanline $\nabla F_1$ and $\nabla L_1$ are shown ($\nabla F_1(p)=F_1(p)-F_1(p-1)$), the difference between adjacent pixels p). As can be seen, this gradient signal is relatively sparse, being close to zero everywhere but in a few locations.

FIG. 4(c) shows a curve 431 of the difference between the two exemplary gradient signals 421, 422 $\nabla F_1-\nabla L_1$, which is also sparse, as shown by shape of the histogram 441 in FIG. 4(d). In considering a dark flash and noisy ambient image pair together, as shown in FIG. 4(e)-(h), for example, the difference between gradients $\nabla F_1-\nabla A_1$ (as shown by curve 451 in FIG. 4(g)) may no longer be sparse. This is also shown by the corresponding Gaussian-shaped histogram 461 in FIG. 4(h), for example.

Reflecting the sparse distribution of $\nabla F_1-\nabla L_1$ in FIG. 4(d), exemplary spectral constraints can take the form of a sparse norm on the gradient difference between channels in the reconstructed image R and the flash image $F_1$, e.g., $|\nabla R_j-\nabla f_1|^\alpha$ where $\alpha \leq 1$. This exemplary embodiment can encourage the edge structures in $R_j$ to align spatially with those in $F_1$ while allowing their magnitudes to differ. Thus, when transitioning between two materials, it can be possible that it does not matter if the spectral reflectances are different in visible and IR/UV bands, provided that there is a significant edge in IR/UV. If an $l_2$ norm is used, this may not be the case, and $\Delta R_j$ and $\nabla F_1$ can closely match, even at material transitions, causing artifacts in $R_j$. While a conventional spatial prior, such as $|\nabla R_j|^\alpha$, $\alpha<1$, can also reduce noise, it can not encourage the edges to align with those of F which are close to those of the desired solution L as can be accomplished with various exemplary embodiments in accordance with the present disclosure.

An similar exemplary constraint can also be imposed to the UV channel: $|\nabla R_j-\nabla F_3|^\alpha$, where $F_3$ records UV and $F_1$ records IR. For $R_3$ (the blue channel), this can be a strong constraint since, in terms of wavelength, blue is much closer to UV than to IR. In this example, 1-D gradients have been considered, but both x and y gradients can be used in real-world problems, with separate terms for each. As used herein, $\nabla$ refers to both $\nabla_x$ and $\nabla_y$.

Exemplary Spatial-Spectral Cost Function

An exemplary cost function in accordance with the present disclosure can consist of, e.g., three main terms: (i) Likelihood: the intensities of the reconstruction $R_j$ should be close to those of the noisy ambient image A under an $l_2$ norm, assuming a Gaussian noise model; (ii) Spatial prior: $\nabla R_j$ should be small under a sparse norm, reflecting the heavy-tailed nature of image gradients, which spatial prior term can help, e.g., to provide a further boost to image quality; and (iii) Spectral constraint: $\nabla R_j$ can be close to both $\nabla F_1$ (IR) and $\nabla F_3$ (UV) under a sparse norm, as described herein above, for example.

As with existing flash/no-flash techniques, exemplary embodiments in accordance with the present disclosure can use a shadow and specularity mask m(p) which can, e.g., remove artifacts from the flash image. Details of the mask construction are described further herein below. For example, the overall cost function for each channel j can be:

$$\operatorname*{argmin}_{R_j} \sum_p \left[ \underbrace{\mu_j m(p)(R_j(p) - A_j(p))^2}_{Likelihood} + \underbrace{\kappa m(p)|\nabla R_j(p)|^\alpha}_{Spatial} + \underbrace{|\nabla R_j(p) - \nabla F_1(p)|^\alpha}_{IR\ Spectral} + \underbrace{|\nabla R_j(p) - \nabla F_3(p)|^\alpha}_{UV\ Spectral} \right] \quad (5)$$

As used herein, unless otherwise noted, $\kappa=1$ and $\alpha=0.7$. Each channel j can be solved separately. For example, m(p) can have the effect of increasing the weight on the likelihood and spatial terms in regions of shadows or specularities. It can also be assumed that the UV and IR spectral terms have equal weight for all channels j. Hence, the weighting on the reconstruction term for each channel p is the most important parameter in this exemplary model and can strongly depend on the noise level of the ambient image A. Since the blue channel can often be significantly noisier than the other channels, a different value can be used for $\mu_3$ than for $\mu_1$ and $\mu_2$, which can be set to be the same. If $\mu_j$ is set to a large value then the colors of R can be close to those of A at the expense of increased noise. Conversely, if $\mu_j$ is small then the noise in R can be reduced, but the colors can deviate from those in A. Choosing the value of $\mu_j$ can be done semi-automatically from the level of under-exposure of A (given by a camera's exposure meter) and the camera's ISO setting, for example. According to certain exemplary embodiments, the value can also be fine-tuned on a small image patch before processing the entire image. Typical values can range from, e.g., $\mu_j$=approximately 5 (high noise) to $\mu_j$=approximately 40 (low noise).

Returning to the 1-D example of FIGS. 4(a)-4(l), the scanline across the color chart for exemplary reconstructed image R in FIGS. 4(i)-4(l) is shown. Despite the spectral reflectances of the squares being quite different, the intensities of $R_1$ shown by curve 471 in FIG. 4(i) closely match those of the desired solution $L_1$ in FIG. 4(a). As shown, $R_1$ can be kept close to $A_1$ (e.g., shown as curve 481 in FIG. 4(e)) by an exemplary likelihood term, while the sparse norm on the spectral terms can remove the noise.

Equation 5 (which is non-convex if, e.g., $\alpha=0.7$) can be optimized using, e.g., Iterative Re-weighted Least Squares (see, e.g., Levin, Fergus, Durand and Freeman, supra), initializing with $R_j=F_j$. Due to relatively poor conditioning of the least-squares systems, an incomplete Cholesky preconditioner can be used to speed convergence.

For example, for a 1.3 megapixel image, an unoptimized Matlab implementation can takes approximately 25 minutes for all 3 channels, with 5 iterations per channel. As this may be unacceptably slow for some practical situations, a considerable speedup can be achieved by, e.g., setting $\alpha=1$. This can make the problem convex and fast numerical schemes can be used (see, e.g., Wang, Y. et al., supra), that can result in a processing time of approximately 3 minutes, comparable to relatively efficient implementations of the cross-bilateral filter. However, some image quality can be lost in using $\alpha=1$, as described herein below with reference to FIG. 9, for example.

Exemplary Pre- and Post-Processing

Pre-Processing.

The exemplary images shown and described herein were captured in RAW mode. They were then demosaiced and manually white-balanced using some neutral-colored object (e.g. a wall or calibration target) in the scene. The mask m(p) was built using a similar procedure to that described in, e.g., Petschnigg et al., supra. The shadows were detected by finding areas where |F−A| is relatively very small. Specularities were found by looking for pixels saturated in $F_1$ (IR channel). In areas of shadow/specularity m(p)=5 and m(p)=1 in the other areas, smoothly varying between the two at the boundaries. In high noise conditions, it is possible to apply a small Gaussian smoothing to $A_j$ to break up any spurious image structure formed by the noise. The optimization can then be performed on the linear tonescale images (e.g., without gamma correction).

Post-Processing.

If the ambient light levels are low, the colors in the ambient image can become imbalanced, particularly with a blue tint due to excessive noise levels in the blue channel, for example. Thus, the output of the optimization can also have a similar color cast and generally will not look similar to a long-exposure shot L. To compensate for this, an additional color correction operation that applies a global color mapping to R can be used, for example. To generate this mapping function, the tone response curve of an exemplary camera can be determined for each color channel using a stack of images taken over a wide range of exposures (see, e.g., Debevec and Malik, *Recovering high dynamic range radiance maps from photographs*, ACM Transactions on Graphics (Proc. SIGGRAPH) 31, 3, 369-378 (1997)). Particular care can be taken when fitting the parametric model to the low intensity part of the curve. In this regime, the sensor noise can cause the curve to be non-linear, in turn giving rise to the color casts observed in very noisy images. By passing each $R_j$ through its appropriate mapping function, it is possible to infer the true value of each pixel, yielding colors close to those in a long-exposure shot L. Finally, it is possible gamma-correct the images for display, using $\gamma=1.8$, for example.

Exemplary Results

For an exemplary dark flash system to be practical in accordance with certain exemplary embodiments of the present disclosure, it can be preferable to achieve high quality reconstructions in low levels of ambient illumination.

Figure 5:
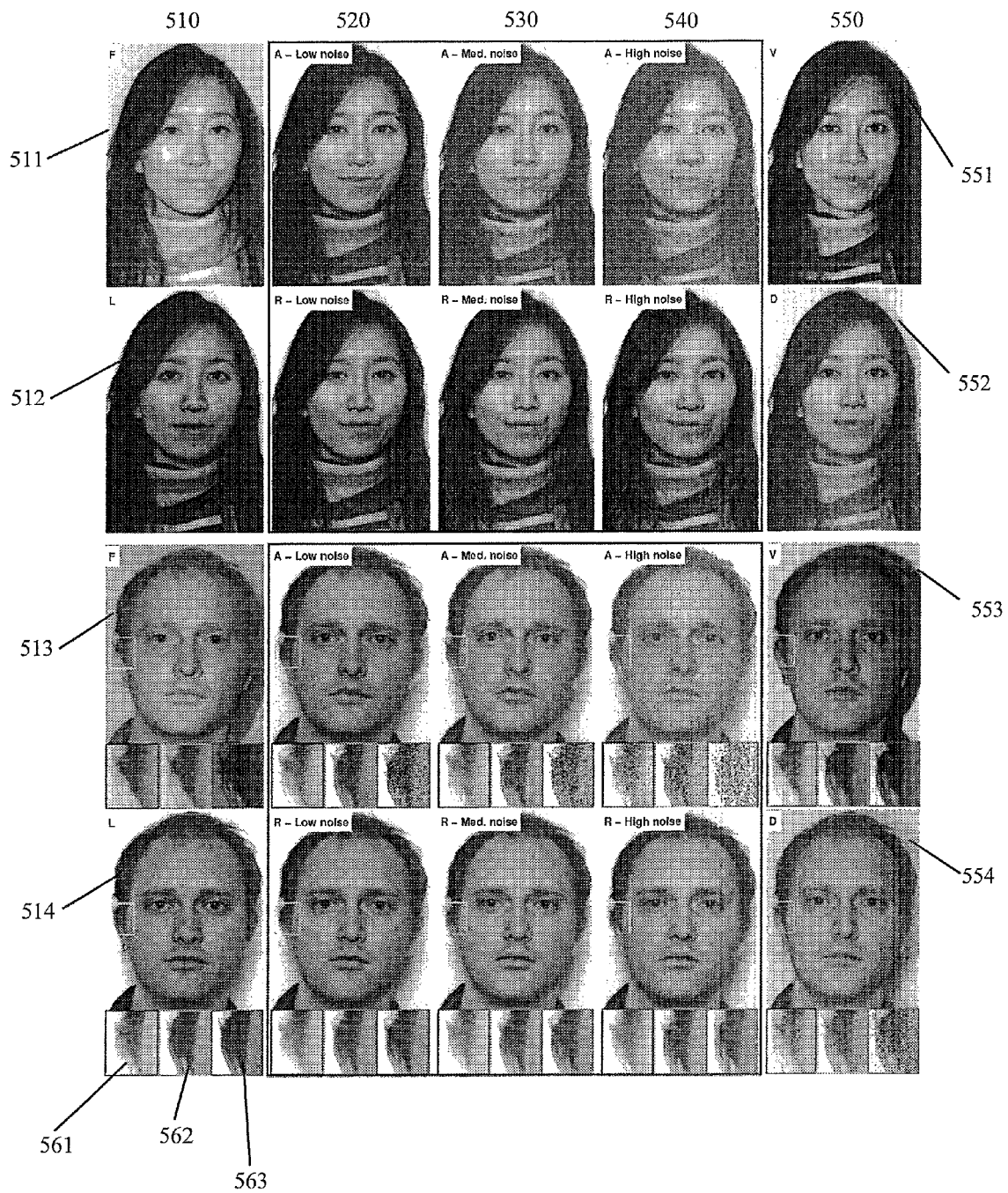
FIG. 5 are exemplary illustrations of two portrait shots captured with an exemplary camera/flash under tungsten illumination.

For example, FIG. 5 shows exemplary illustrations of two portrait shots captured with an exemplary camera/flash under tungsten illumination. Within each group, column 1 510 shows the dark flash shot (F) 511, 513 and long exposure reference (L) 512, 514. The exemplary results are shown in Columns 2 520, 3 530 and 4 540. For each ambient image (A) of decreasing exposure (yielding increased noise), the reconstructed output (R) is shown. Column 5 550 shows a visible flash image (V) 551, 553, along with a visible flash shot (D) 552, 554 attenuated with neutral density filters so that it is comparably dazzling to F. The Low, Medium and High noise levels correspond to 6, 7 and 8 stops of underexposure respectively (e.g., corresponding to ¹⁄₆₄th, ¹⁄₁₂₈th and ¹⁄₂₅₆th of ambient long exposure). In the lower group, corresponding to shot 513 and exposure reference 514, a zoomed-in section is shown, separated into red, green, blue color channels 561, 562 and 563, respectively.

Figure 6:
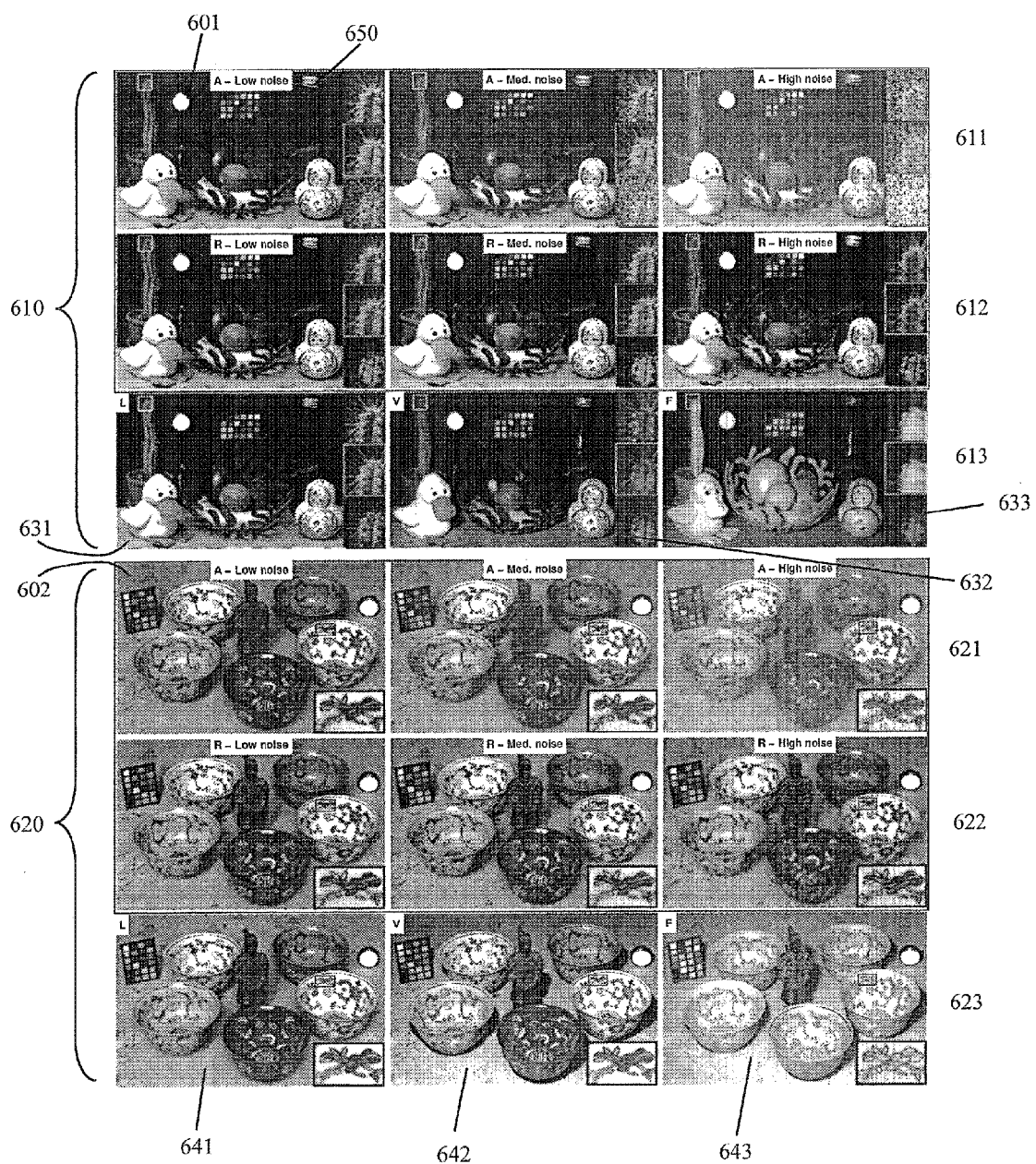
FIG. 6 are exemplary illustrations of two different scenes captured with an exemplary camera/flash under fluorescent illumination.

FIG. 6 shows exemplary illustrations of two different scenes 601, 602 captured with an exemplary camera/flash under fluorescent illumination. Within each group 610, 620, row 1 611, 621 and row 2 612, 622 show shots under ambient illumination (A) of decreasing exposure (yielding increased noise) and exemplary reconstructed output (R). Row 3 613, 623 show, from left to right: Long exposure reference (L) 631, 641, Visible flash shot (V) 632, 642 and dark flash shot (F) 633, 643. In the top group 610, Low, Medium and High noise levels correspond to 5, 6 and 7 stops of underexposure respectively (equating to ¹⁄₃₂nd, ¹⁄₆₄th and ¹⁄₁₂₈th of ambient long exposure). In the bottom group 620, Low=5.5, Medium=6.5 and High=7.5 stops underexposed (corresponding to ¹⁄₄₅th, ¹⁄₉₀th and ¹⁄₁₈₀th of ambient).

The test images shown in FIGS. 5 and 6 were captured using two different types of ambient illumination (tungsten and compact fluorescent) and contain a wide range of materials and colors. As described above, to show how the noise levels vary across color channel, a small region in two of the exemplary images shown in FIG. 5 is also shown, separated out into its constituent color planes. This typically reveals the blue channel to be far noisier than the others.

To make comparisons straightforward, the shutter speed used to capture the flash/no-flash pair can be varied, thus simulating different levels of ambient illumination. In practice, according to some exemplary embodiments of the present disclosure, the shutter speed can be set to the slowest level that avoids camera shake, irrespective of the level of ambient light. As the light levels drop, the ambient image can become noisier (while the dark flash image F can stay constant) thus making the reconstruction harder. Three different noise scenarios are described herein: (i) Low, where it is possible to achieve reconstructions close to a long exposure reference shot; (ii) Medium, where the reconstruction is acceptable in terms of quality and (iii) High, where a significant degradation in quality is visible and the failure modes of the algorithm are evident. At each noise level, the degree of under-exposure of the ambient image A, relative to the long exposure reference L, is quoted. These can range from ¹⁄₃₂nd of ambient illumination (e.g., as shown in the exemplary images of FIG. 6, group 610), down to ¹⁄₂₅₆th for the exemplary portrait shots shown in FIG. 5, for example. Assuming ¹⁄₃₀th of a second can be used to avoid camera shake, the results can be equivalent to taking pictures in conditions where exposures ranging from 1 second to 8 seconds could otherwise be required. Techniques that permit relatively blurfree photography at slow shutter speeds, such as image stabilizers, could extend the range of operation of some exemplary dark flash systems to even longer equivalent exposures.

Achieving accurate alignment between F and A can be an important practical issue due to the spectral constraints. While various software approaches for image registration exist (see, e.g. Baker et al., *Lucas-kanade 20 years on: A unifying framework*, International Journal of Computer Vision 56, 221-255 (2004)), a commercial implementation of an exemplary system could use a hardware approach based on sensors that can capture the exemplary images with very little to virtually no delay between them (see, e.g. specifications of Fuji Finepix Z10fd), providing for good alignment. Thus, according to certain exemplary embodiments of the present disclosure, it is possible to resolve this issue and capture the shots using such hardware with a tripod, for example.

At high noise levels, some color deviations and loss of detail can be observed. This can be a consequence of low $\mu_j$ values which give the likelihood term little weight in the optimization. At all noise levels, it is possible that reconstructions can contain some artifacts that result from the dark flash illumination. If a material absorbs both UV and IR strongly, then F can contain no gradients to guide the reconstruction. Examples of this include the freckles on the man shown in FIGS. 1 and 5, and the red lips of the doll shown in FIG. 6. This can be relatively uncommon, as demonstrated by the range of colors and materials in the exemplary shots, the vast majority of which can be accurately recovered. In particular, human skin and hair, two materials that can be relevant to exemplary dark flash applications, can be plausibly reproduced.

Exemplary Comparison Experiments

Figure 7:
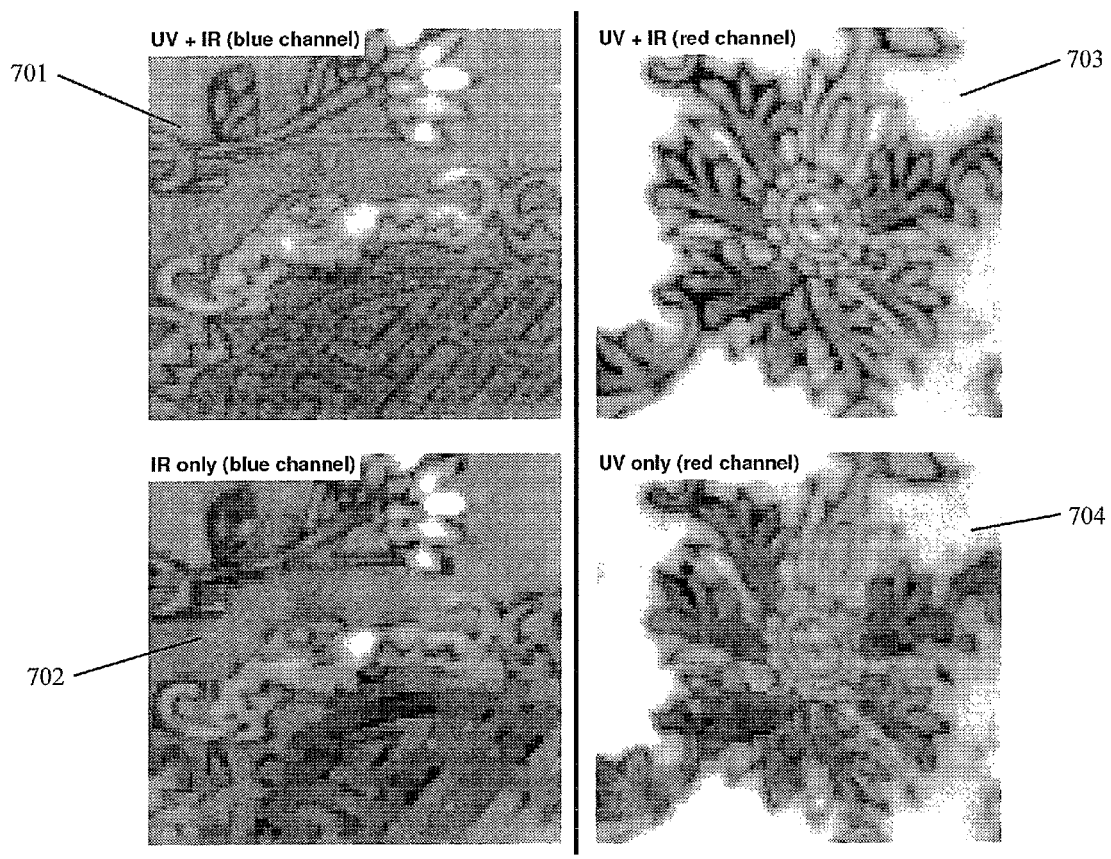
FIG. 7 are exemplary images of close-ups of the example bottom group of images illustrated in the example of FIG. 6.

FIG. 7 shows exemplary close-up images of the bottom group 620 of FIG. 6. FIG. 7 illustrates the importance of having UV and IR in some exemplary embodiments of dark flash by showing the results when the corresponding spectral term in the cost function of Equation 5 is removed, and thus the both spectral terms in Equation 5 being used. Panel 701 shows the blue channel of reconstructed image R using both the UV and IR spectral terms. Panel 702 shows the blue channel using only the IR spectral term. Panel 603 shows the red channel of reconstructed image R using both the UV and IR spectral terms. Panel 704 shows the red channel using only UV spectral term. As shown, the removal of the flash in the adjacent band can cause a degraded result. Thus, FIG. 7 shows both the UV and IR components being used, since, if either were to be removed, the adjacent spectral bands (blue and red, respectively) in R can become degraded.

Figure 8:
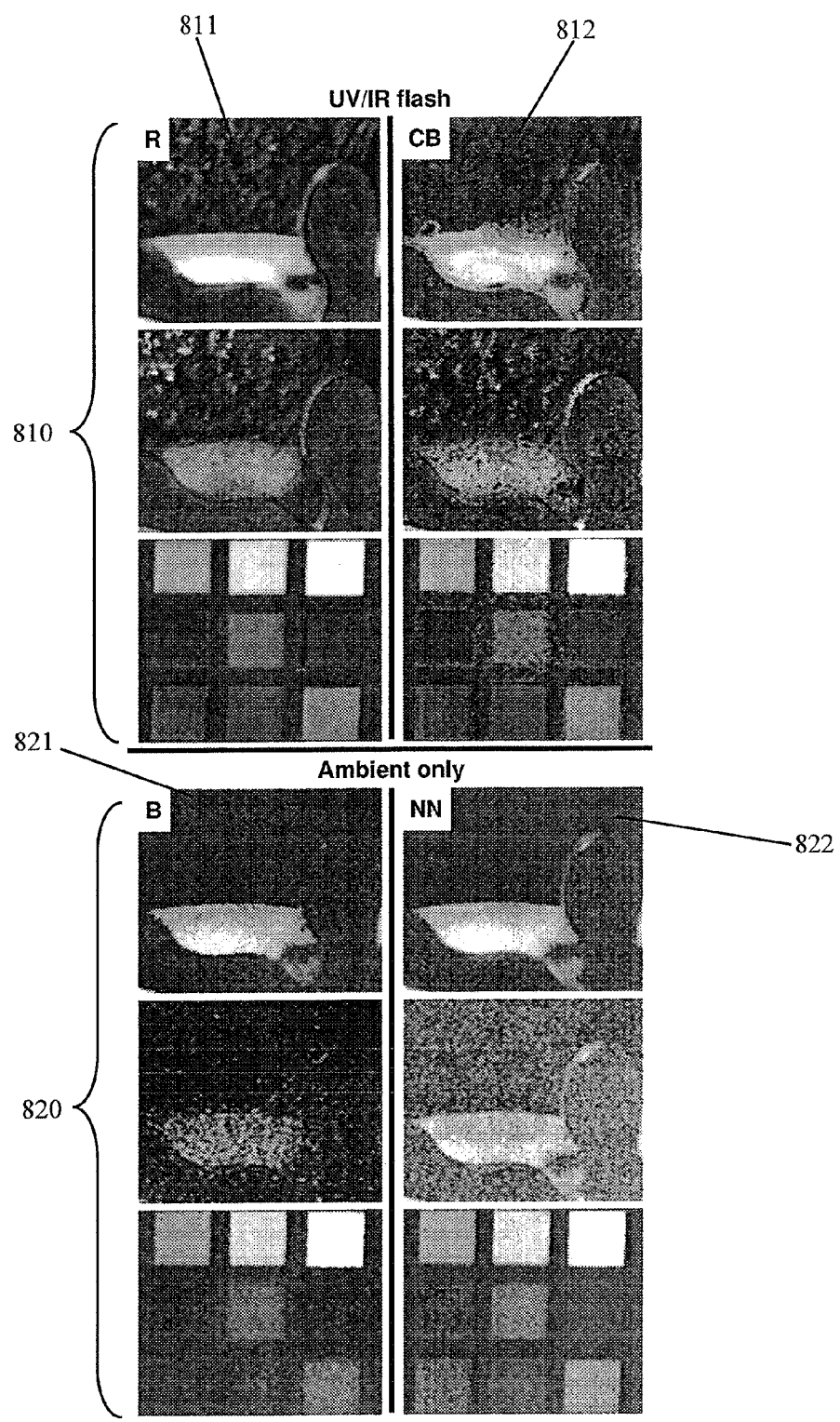
FIG. 8 are exemplary comparisons of an exemplary approach in accordance with the present disclosure to different processing methods, illustrating two crops from the top group of images illustrated in FIG. 6.

FIG. 8 shows exemplary comparisons of an exemplary approach in accordance with the present disclosure to different processing methods, showing two crops from group 610 of FIG. 6, along with the blue channel of the first crop. The top set 810 uses a dark flash/ambient image pair, while the bottom set 820 uses the ambient image only. Image R 811 was reconstructed using spectral constraints. Image CB 812 is of a pipeline as described in, e.g., Petschnigg et al., supra, based on cross-bilateral filter and detail enhancement. Image B 821 was produced using a bilateral filter of ambient image (see, e.g., Tomasi et al., supra). Image NN 822 was produced using the Noise Ninja commercial denoising plugin for Photoshop (see, e.g., Christian and Zapata, Noise Ninja, *Photoshop denoising plugin*, available at http://www.picturecode.com (last accessed Jan. 7, 2010)). As shown in FIG. 7, for example, the exemplary reconstruction approach in accordance with the present disclosure produced superior results to the example cross-bilateral approach and the example standard denoising methods.

As shown in FIG. 8, the mid-noise case is used for comparison of an exemplary embodiment in accordance with the present disclosure to alternate methods. As shown, using the dark flash/ambient image pair with the processing pipeline based on the cross-bilateral filter and detail enhancement approach described in, e.g., Petschnigg et al., supra, the results obtained were inferior to results obtained through using exemplary approaches in accordance with the present disclosure. The range term in the cross-bilateral filter caused the edge strength in the flash image F to directly influence the smoothing of the ambient image A. Thus it can only operate correctly if the edges in F and A are closely matched in magnitude, an unrealistic assumption since spectral reflectances typically differ between bands. In contrast, an exemplary model in accordance with the present disclosure can permit the edge magnitudes to differ when $\alpha \le 1$ in Equation 5, giving a reconstruction of superior quality. Second, two approaches that have been attempted to directly denoise the ambient image include: (i) bilateral filtering (see, e.g., Tomasi et al., supra) and (ii) a commercial denoising tool, Noise Ninja (see, e.g., Christian and Zapata, supra). Both methods were demonstrated to have performed poorly in comparison to the flash/no-flash approaches.

Figure 9:
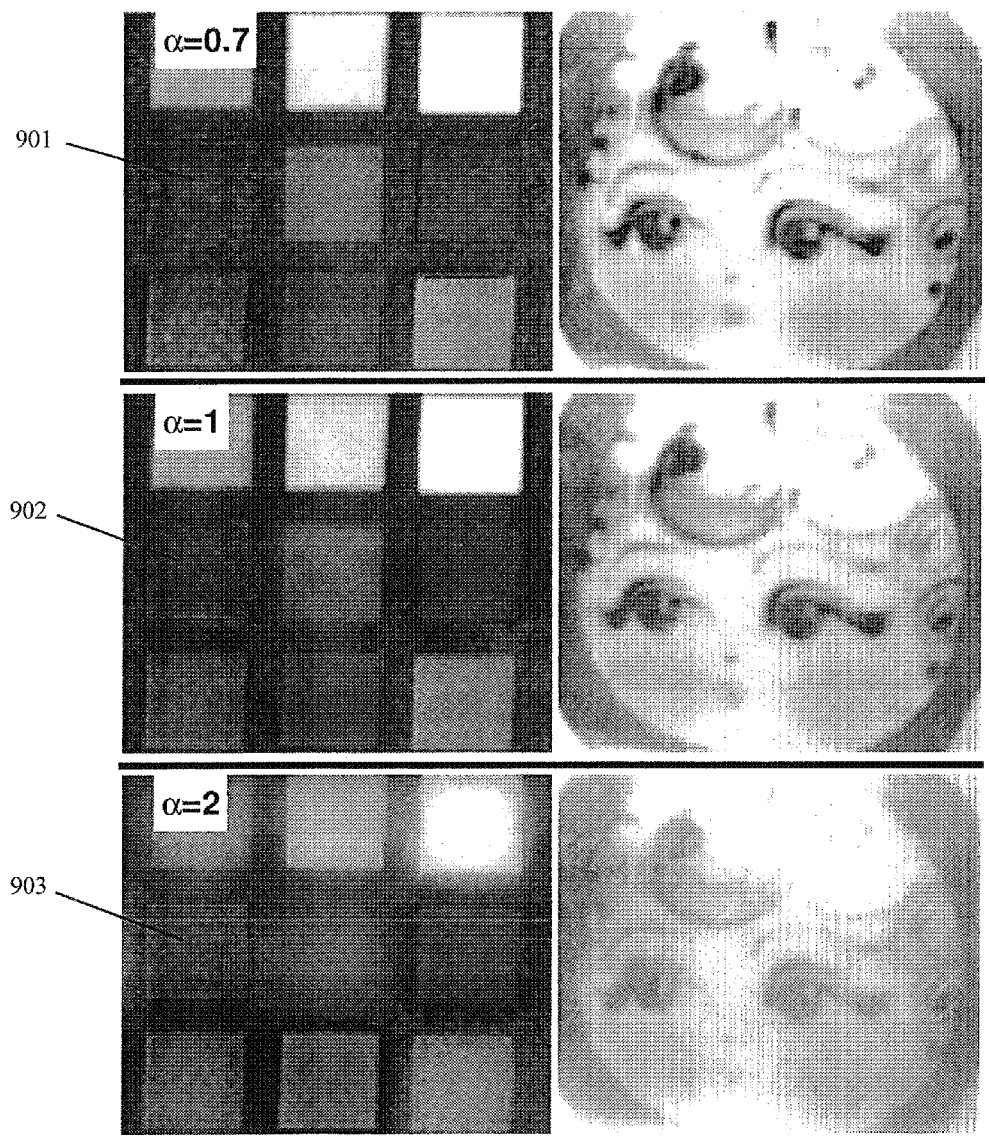
FIG. 9 are exemplary illustrations demonstrating how the value of a in exemplary Equation 5 can effect the reconstruction.

FIG. 9 shows exemplary illustrations demonstrating how the value of $\alpha$ in Equation 5 can effect the reconstruction. When a non-sparse norm is used ($\alpha=2$), as shown in row 903, the ambient colors can bleed. This can be prevented by, e.g., using $\alpha \le 1$, as shown in row 902, with some improvement in quality for $\alpha=0.7$, as shown in row 901.

As shown in rows 901, 902, for values $\le 1$, R can contain crisp edges, even if the spectral reflectances of the materials in visible and non-visible wavelengths differ somewhat, as can typically be the case. Setting $\alpha=2$ has the undesirable effect of causing the colors to bleed between regions. When $\alpha=2$ the spectral constraints force the edges in the UV/IR flash and ambient to be the same, an unrealistic assumption given that they are captured at different wavelengths.

Exemplary Fluorescence

Certain materials can fluoresce when illuminated by the UV component of an exemplary flash, the most common instances being white items of clothing such as the stripes shown in FIG. 5 (top portrait). Fluorescence can manifest itself as visible blue light that gives an unnaturally bright intensity in $F_3$ in that part of the scene. Experimentally, this phenomenon was found to be relatively rare: test scenes contained a wide range of materials, natural and man-made, yet this phenomenon only occurred in a few locations. It is not the dominant source of signal in $F_3$, as demonstrated by FIG. 3 (bottom). Where this phenomenon does occur, it can produce some minor purple artifacts. In addition, other people observing subjects during the photograph may see a glow from the clothing, thus making the flash slightly visible to them, although the subjects themselves should not notice this if looking at the camera.

Exemplary Photometric Flash Measurements

An object of certain exemplary embodiments of dark flash is that it should be as unnoticeable as possible to human subjects. In certain exemplary experiments, the dark flash output was measured with a spectrometer to determine the spectral irradiance (shown in FIG. 2(*b*)) approximately 1 m from the flash. This was then converted to photometric units, using the photopic luminosity function as described in, e.g., Vos, J., *Colorimetric and photometric properties of a 2-deg fundamental observer*, Color Research and Application 125-128 (1978). The luminous exposure for the dark flash was approximately 1.6 lux seconds. A visible flash set to produce an image V of similar intensity to a dark flash image F had luminous exposure of approximately 362 lux seconds, a factor of approximately 226 times brighter. This ratio agrees closely with the experiment results shown in FIG. 3(*b*), where an attenuation of approximately 220 times was used to make the visible flash of comparable brightness to the dark flash. In FIG. 5, exemplary images D are shown that were obtained with a visible flash attenuated by this factor. The resulting images can be unacceptably noisy.

Subjectively, some indications can exist that, when looking directly at the flash, subjects can see a weak purple light that does not dazzle or leave an afterimage. It was also reported that if not looking directly at the dark flash, the burst of light was often not seen. By contrast, when using a visible flash that provides a comparable scene exposure, the burst of light can be highly dazzling and leave a strong after-image.

Exemplary Estimation of Spectral Reflectance

By taking two images, one with the dark flash, the other with a visible flash, it is possible to obtain 5 different spectral measurements at each point in the scene, e.g., UV, B, G, R and IR, as opposed to 3 obtained with a conventional camera. The spectral reflectances of real world materials can be accurately modeled in a low-dimensional subspace using PCA with relatively few components (see, e.g., Wandell, B. A., *Foundations of Vision*, Sinauer Associates (1995)). Using a spectrometer and reflectance probe, it is possible to measure approximately 255 different materials in the real world and compute a set of 5 PCA basis functions for the range of approximately 360-800 nm. It can then be possible to use the constrained least squares formulation described in, e.g., Park et al., *Multispectral Imaging Using Multiplexed Illumination*, ICCV 1-8 (2007), to solve the spectral reflectance functions for the points in the scene (S(p, $\lambda$) in Equation 4, for example.

Figures 10A, 10B:
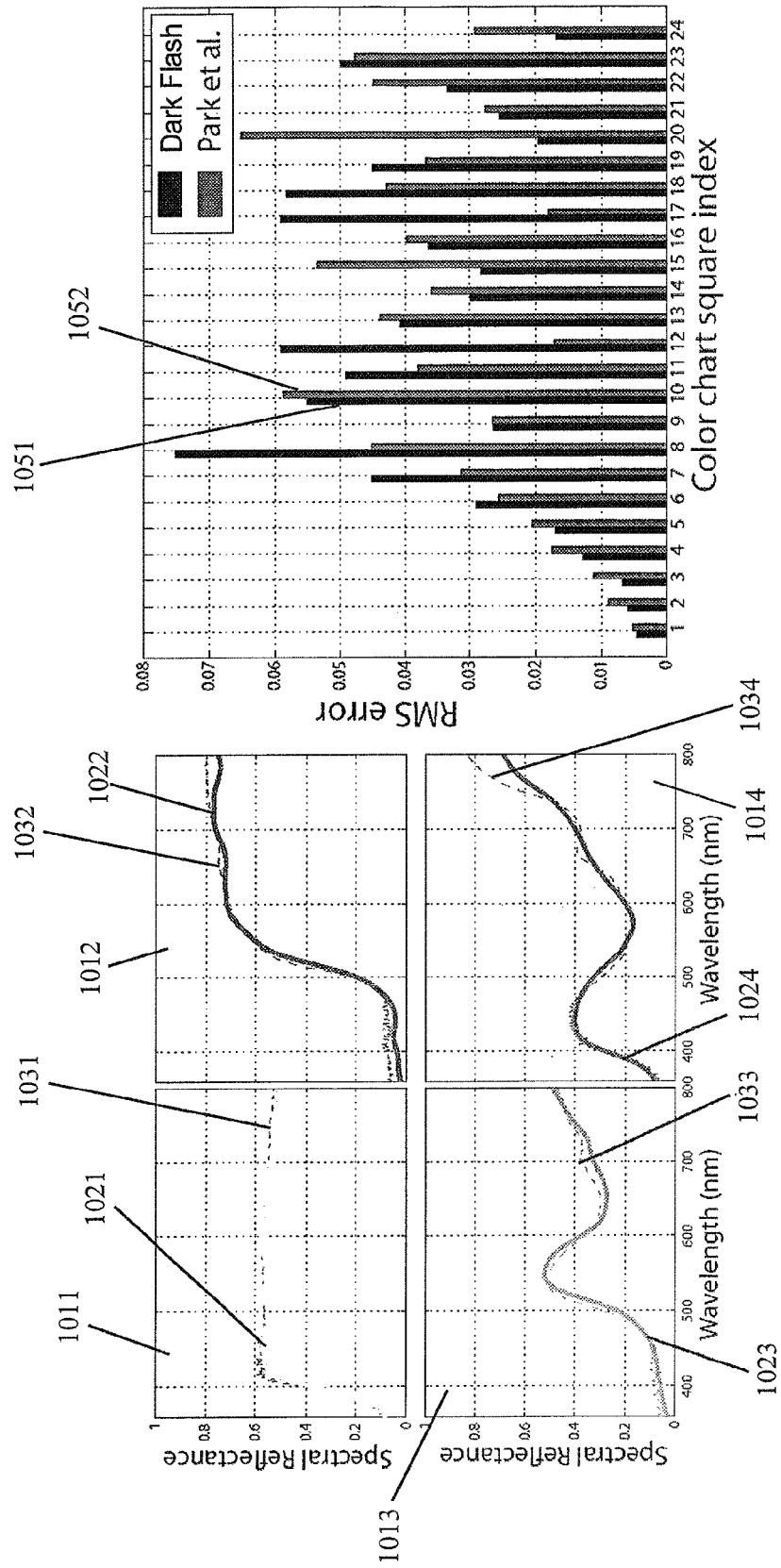
FIGS. 10($a$) and 10($b$) are exemplary graphs which are generated using a dark/visible flash pair being able to accurately infer the spectral reflectance of objects.

FIGS. 10($a$) and 10($b$) show exemplary graphs generated when using a dark/visible flash pair being able to accurately infer the spectral reflectance of objects. For example, FIG. 10($a$) shows a spectra of four different squares 1011, 1012, 1013, 1014, from the example of FIG. 6. The solid lines 1021, 1022, 1023, 1024 show the inferred spectrum. The dashed lines 1031, 1032, 1033, 1034 show the ground truth. FIG. 10($b$) shows RMS estimation errors 1051 for all 24 squares in the color chart 650 of FIG. 6 over an approximately 400-700 nm range, compared to example results 1052 of a multi-spectral illumination approach as described in, e.g., Park et al., supra. As shown, it is possible to accurately infer the spectrum beyond the visible range. A similar total error was achieved with an exemplary dark flash embodiment to the approach described in Park et al., supra, e.g., approximately 0.82 and 0.79 respectively, compared to approximately 1.19 when using R, G, B channels alone, for example.

Exemplary Color-Band Denoising

The spectral constraints used in an exemplary dark flash approach can be applied to images captured by standard cameras. One exemplary illustration, as shown in FIG. 11, is for conventional flash/no-flash processing, using a visible flash/ambient pair.

Figure 11:
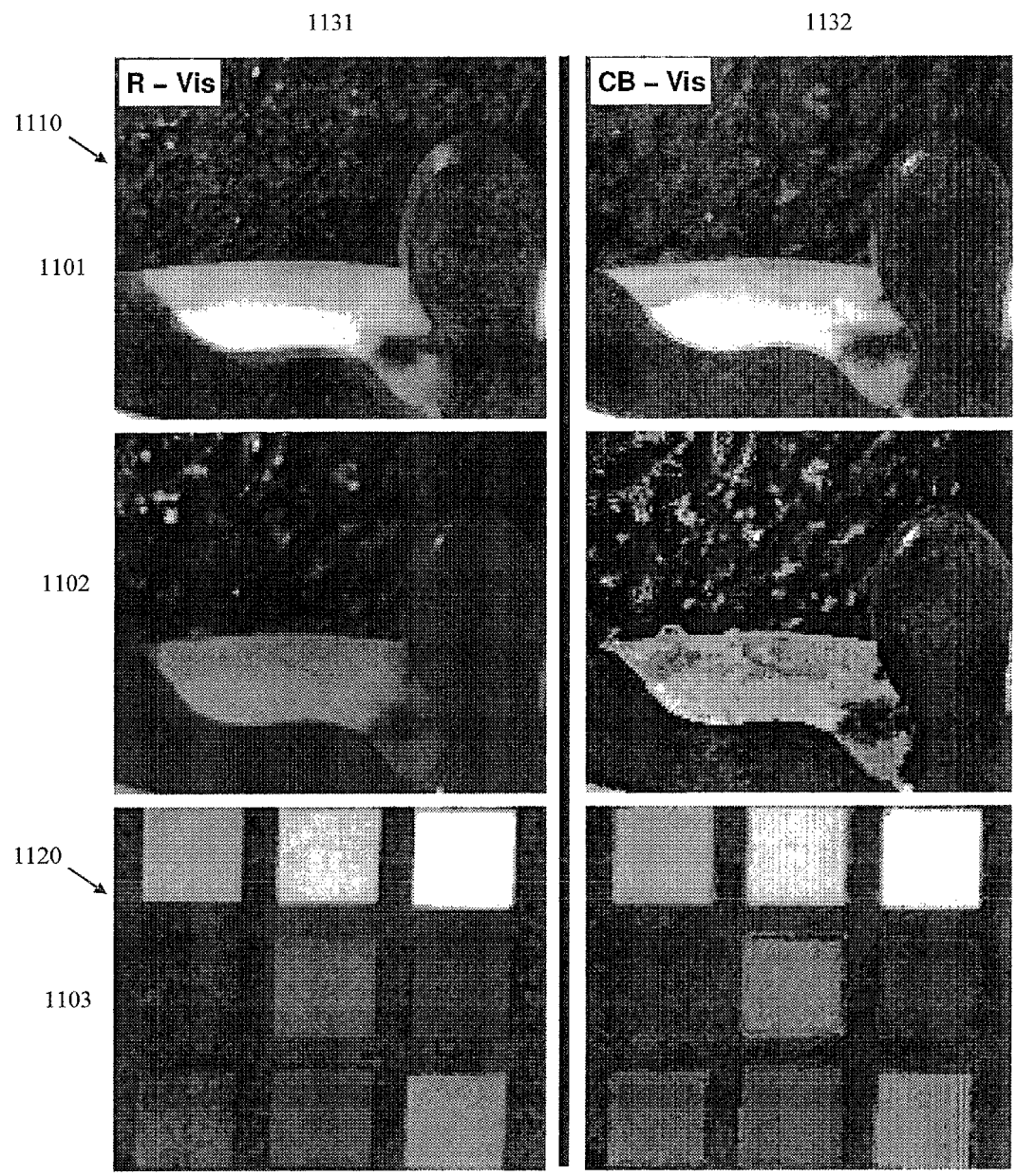
FIG. 11 are exemplary images of the model in Equation 5 being used in a visible flash/no-flash setting.

FIG. 11 shows exemplary images of the model in Equation 5 being used in a visible flash/no-flash setting. For example, FIG. 11 illustrates the two exemplary crops 1110, 1120 from group 610 of FIG. 6, with the center row 1102 showing the blue channel of the first row 1101. R-Vis 1131 illustrates reconstruction with an exemplary model using spectral constraints. CB-Vis 1132 illustrates an example pipeline as described in, e.g., Petschnigg et al., supra, based on cross-bilateral filter and detail enhancement. When using an exemplary algorithm in accordance with the present disclosure in this configuration, the spectral constraint can reduce to a single term linking each channel in the flash image to its corresponding channel in the ambient. Thus, the term no longer links between different spectral bands. As shown, the example according to the present disclosure yielded better results than the crossbilateral based method example.

Another example of an application is where one color channel is much noisier than the others. For example, candle-light is very weak in the blue part of the spectrum compared to red and green. Hence when attempting to white balance a candle-lit image, the blue channel should be multiplied by a large factor, increasing the noise levels. Using spectral constraints, the blue channel can be denoised using the red and green channels (in place of $F_1$ and $F_3$ in exemplary Equation 5). This can provide a superior result to denoising the blue channel using, e.g., spatial priors and likelihood alone.

Figure 12:
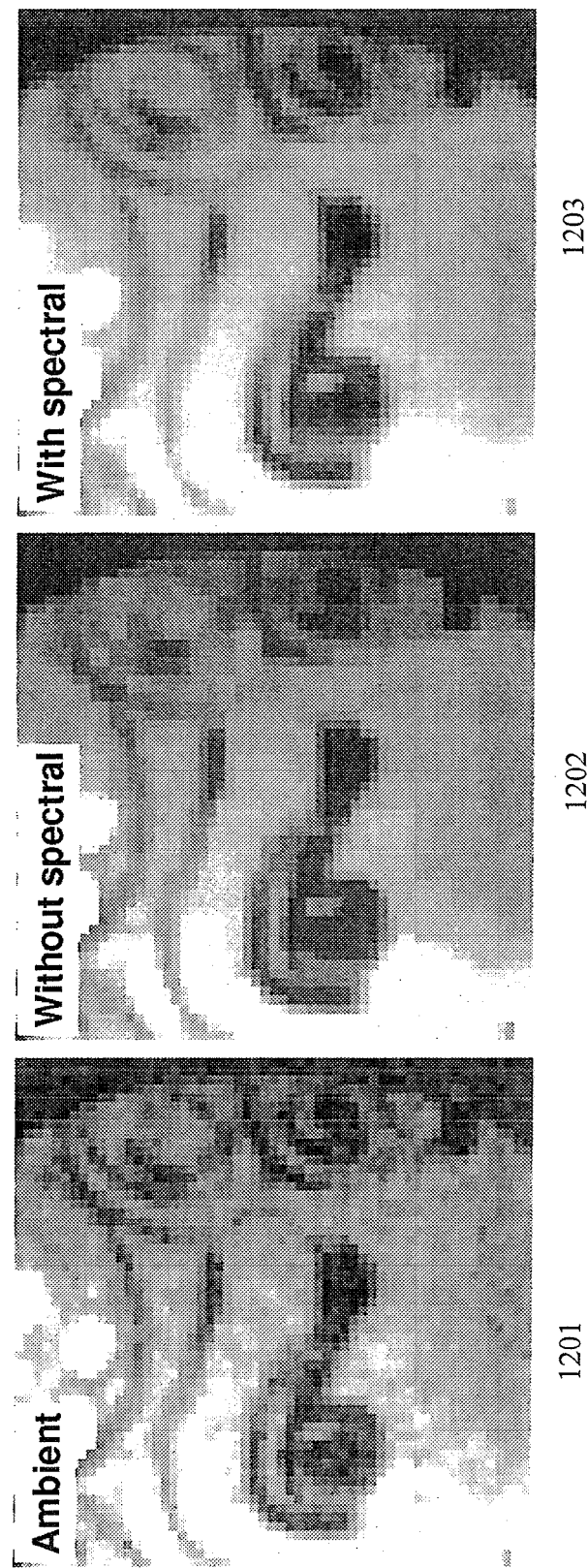
FIG. 12 are exemplary close-ups of the scene of images illustrated in the top group of FIG. 6 illuminated by candle-light.

FIG. 12 shows exemplary close-up images of the scene in group 610 of FIG. 6 illuminated by candlelight, the candlelit image being captured with an unmodified Canon 40D. Panel 1201 shows blue channel of white-balanced ambient shot. There is high noise shown in the ambient image of panel 1201 that can be due to the lack of blue wavelengths in candle-light. Panel 1202 shows example results of denoising of ambient light using likelihood and spatial priors only. Panel 1203 shows example results of denoising of ambient light using spectral constraints from the red and green channels, in addition to the likelihood and spatial priors. As shown by this example, the spectral constraints technique can significantly improve the results.

Exemplary Discussion

As described and demonstrated herein, an exemplary camera and flash system in accordance with the present disclosure can take pictures in low light conditions using a flash that is substantially less noticeable and disruptive than a conventional one. According to certain exemplary embodiments, exemplary camera and system can primarily use standard hardware combined with novel image processing techniques, as described herein for example. The spectral constraints can be a powerful way of combining the images, yielding good quality results in low light conditions. In addition, it has been shown that the hardware and software techniques disclosed and described herein can be used in a number of other applications.

For example, exemplary hardware described herein can be implemented in a number of ways to, e.g., achieve the same results while taking only one image of a scene, allowing for the capture of faster moving scenes and simplifying the overall complexity of a system in accordance with the present disclosure. For example, it can be possible to implement exemplary embodiments in accordance with the present invention using a single image, by, e.g., modifying the Bayer pattern on the sensor to include UV-only and IR-only pixels (e.g., for a total of 5 channels), using certain filters and/or varying the exposure time. Additionally, different flash units can be used to replace the relatively large one shown herein that have more compact UV and IR LEDs providing a more controllable pulse duration and a more precise spectral emission, perhaps further reducing the visibility of the flash. These and other hardware modifications in contemplation and accordance with the present disclosure can also allow for exemplary embodiments of the present invention to be implemented in small platforms such as, e.g., cellular (cell) phones, where a flash can often be needed due to poor lowlight performance on account of the small sensor size, for example.

Exemplary Hardware Details

Exemplary experiments described herein can use a standard Nikon 50 mm f/1.8 lens, which can transmit light down to approximately 350 nm and thus may not the limiting factor in the camera's UV response. A MaxMax CC3 filter was attached to the lens during the experiments described herein. The filter was used to block IR light above approximately 850 nm, which can otherwise distort the colors of the ambient image (as the naked sensor's response can extend out to approximately 1100 nm). According to some exemplary embodiments, an IR-block filter can be used that, e.g., blocks IR light having wavelengths above approximately 800 nm. This filter can tend to not block either visible light or the dark flash. The response functions $C_j(\lambda)$ in FIG. 2(a) can include the filter and lens, for example. The flash that was used in the experiments described herein is similar to the Nikon SB-14UV, adapted from a standard SB-14 by removing the UV absorbent coating on the Xenon flash tube. A Hoya U360 filter was attached to the flash to filter out visible light. The standard visible flash used in comparisons was equipped with a MaxMax CC1 filter to block its significant IR output.

Exemplary Single Image Blur/Flash Low-Light Photography Procedure

Obtaining an image in low light situations where the shutter can be held open for a relatively long duration of time to avoid a noisy output image can result in image blur due to camera shake (e.g., motion of the photographers hands) when the camera is hand-held. As discussed herein above, removing this blur can be a very difficult problem known as blind deconvolution. Heretofore existing procedures and/or algorithms for solving such blind deconvolution problem (see, e.g., Freeman et al., U.S. Pat. No. 7,616,826 (Nov. 10, 2010)) are generally not robust and can not handle relatively large blurs.

Disclosed and described herein, for example, is an exemplary procedure for overcoming the above-described and other deficiencies in solving the blind deconvolution problem. For example, the following procedure, method and/or algorithm can provide a single image solution for low-light photography using a conventional camera with a minor modification made to the hardware thereof. According to some exemplary embodiments of the present disclosure, the obtained/recovered image can be of a scene and/or subjects illuminated by ambient light instead of potentially undesirable flash illumination.

In accordance with exemplary embodiments of the present disclosure, it is possible to use a conventional, unmodified camera having a standard flash. As described herein above, a standard flash can, e.g., be a flash configured so that the majority of light emitted has a substantially even distribution over the range of approximately 400 nm to approximately 700 nm). For example, the conventional, unmodified camera can be, e.g., a DSLR, compact camera or cell phone camera.

An exemplary procedure in accordance with the present disclosure can include, e.g., placing a red filter over the flash, which exemplary red filter can be selected and/or configured to block wavelengths of below approximately 630 nm so that, when the exemplary red filter is placed over the flash, the flash can only substantially emit red light (e.g. light having a wavelength of at least approximately 630 nm). As one having ordinary skill in the art should appreciate in view of the present disclosure, a green or blue filter also can be used in accordance with the present disclosure, although using a red filter can provide for better results.

With the flash powered up and ready to fire (e.g., emit light), a single image can be obtained, e.g., using a long shutter duration. The flash can be configured to fire at the beginning of the exposure. As a result, the image obtained/recorded can have (i) blur due to camera shake (e.g., resulting from motion of the photographers hands) and, superimposed on it, (ii) a red flash image, which can be relatively sharp (e.g., non-blurred). The obtained/recorded image can also have little or no substantial noise. Accordingly, the obtained and/or captured image can have three channels (e.g., red, green, blue), with the green and blue channels being blurred (e.g., by camera shake). Red can be a superposition of a blurry image with a relatively sharp image (e.g., as a result of the flash as disclosed and described herein).

To recover a blur-free output image of a scene and/or one or more subjects, an exemplary procedure (and/or algorithm) in accordance with the present disclosure can include and proceed in, e.g., two stages (sub-procedures), disclosed and described as follows.

1. A first exemplary stage/sub-procedure, for example, can be for estimating the blur, which sub-procedure can be called, e.g., an estimation procedure, and include, e.g., (a) estimate the flash image in the red channel F as, e.g., F=red−(green+blue)/2;

(b) combine the green and blue channels to form a blurry image B, which can be expressed as, e.g., B=(green+blue)/2; and (c) using F and B, it is possible to estimate the blur, which can be encoded as a blur kernel k. For example, according to some exemplary embodiments, this estimation can be performed by minimizing a least-squares system where k is the unknown and F and B are known. One having ordinary skill in the art should appreciate in view of the present disclosure that there are other procedures, methods and/or algorithms that can be used to perform this estimation aside from minimizing a least-squares system. As the blur can apply equally to all 3 channels (R, G, B), the blur can be substantially constant over the entire image and handled accordingly by exemplary embodiments of the present disclosure as disclosed and described herein, for example. As one having ordinary skill in the art should appreciate in view of the present disclosure, exemplary embodiments of the present disclosure can also address situations were the blur is not substantially constant over the entire image.

It is possible that the illumination from the flash (which can be present in F, for example) can be different than the illumination from the ambient scene (which can be present in B, for example). Such difference can be a result of, e.g., one or more shadows that can be caused by a flash that would not be present in the ambient scene.

To address this issue, exemplary embodiments in accordance with the present disclosure can, e.g., compute a per-pixel illumination ratio map: e.g., lambda=(F\oplus k)/B, where (F\oplus k) can represent the flash image F blurred by the blur k. The lambda map can then be used to reweight the blurry image B to correct for the illumination change, which can help cover and/or provide for a substantially accurate value of k, for example.

The exemplary estimation procedure can operate in a multi-scale fashion. For example, it is possible to start with highly sub-sampled versions of F and B and estimate a low-resolution version of k and/or lambda. F and B can then be upsampled and used for the initialization of estimation procedure at the next scale. Performing the exemplary estimation procedure in this incremental iterative way can be significantly more robust than an approach attempting to do so directly at the full resolution, for example.

2. A second exemplary stage/sub-procedure, for example, can be for recovering the image, which sub-procedure can be called, e.g., a recovering procedure, and include, e.g.:

(a) Performing non-blind deconvolution on green and blue channels using k to recover sharp versions thereof. To help recover a high quality result, the non-blind deconvolution can use, e.g., (i) gradient priors, such as hyperlaplacian gradient priors, and (ii) a constraint that the edges are close to edges of the flash estimate F. Both the exemplary gradient priors and the edge constraint(s) can be efficiently utilized with and incorporated into exemplary embodiments of the non-blind deconvolution procedures disclosed and described herein. According to exemplary embodiments of the present disclosure, this exemplary sub-procedure can be performed in a multi-scale, incremental, iterative manner, e.g., starting with low-resolution images and incrementally working-up to high resolution images through multiple iterations.

(b) In accordance with exemplary embodiments of the present disclosure, the sharp red channel can be recovered by alternating between two sub-procedures. For example, denoting R as the red channel obtained/captured by the camera, it is possible to express R as, e.g., R=A_r\oplus k+F, where A_r is the desired sharp ambient red image. k can be estimated from above, and a rough initial estimate of F can be known from, e.g., the expression F=R−(Blue+Green)/2 disclosed and described above. Accordingly, the two exemplary sub-procedures that can be alternated between in accordance with exemplary embodiments of the present disclosure can be, e.g., disclosed and described as follows:

(i) Estimating A_r by using (R−F) as the blurry image and using the exemplary multi-scale non-blind deconvolution procedure disclosed and described above, for example. According to exemplary embodiments, it is possible to use, e.g., a hyper-Laplacian prior on the edges of A_r, and a constraint that A_r should be close to A_g and A_b (the exemplary sharp green and green channels recovered above), for example. While the exemplary deconvolution procedure disclosed and described herein can be used, certain other procedures, methods and/or algorithms can be used as well.

(ii) Refining F by, e.g., enforcing the constraint that F=R−(A_r \oplus k), with the a hyper-laplacian prior on F, in accordance with the exemplary embodiments disclosed and described herein, for example.

As one having ordinary skill in the art should appreciate in view of the present disclosure, according to some exemplary embodiments of the present disclosure, such as the exemplary single image blur/flash low-light photography procedure disclosed and described herein, it is possible that recovering the green and blue channels of the image can be relatively easy in comparison to recovering the red channel since it can involve two images and thus exemplary procedures for doing so, as disclosed and described herein for example, can be more complex.

Exemplary Safety Calculations

With further respect to the safety calculations summarized herein above, the exemplary threshold limit values (TLVs) for UV radiation of approximately 180-400 nm incident on the eye (generally considered to be the most sensitive part of the human body with respect to UV radiation) over an approximately 8 hour period can be provided by the formula on p. 155 of TLVs 2001 edition, reproduced as follows in Equation 6:

$$\text{Max flashes} = \frac{3000}{E_{\textit{Eff}}} \qquad (6)$$

Equation 6 can relate the maximum number of flashes to the effective irradiance EEff, relative to a monochromatic source at approximately 270 nm. EEff can be computed, using Equation 7, from the spectral irradiance of the flash $I'(\lambda)$ (units: $\mu J/cm^2/nm/flash$) and a hazard weighting function $H(\lambda)$ (which is approximately 1 at approximately 270 nm), provided on p. 157 of TLVs 2001 edition.

$$E_{\textit{Eff}} = \int H(\lambda) I'(\lambda) d\lambda \qquad (7)$$

Figure 13:
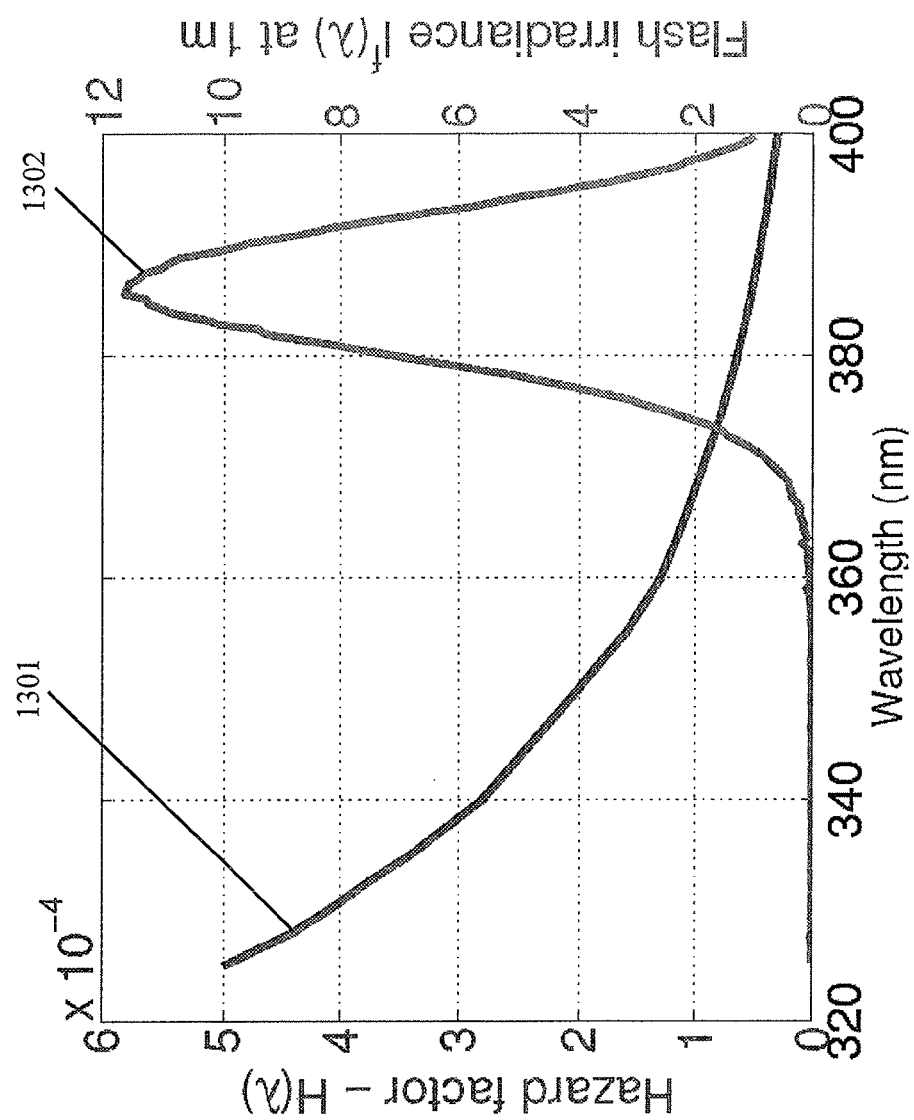
FIG. 13 is an example graph of a UV exposure to human health hazard.

FIG. 13 shows an exemplary graph of $I'(\lambda)$ 1301 and $H(\lambda)$ 1302. Integrating over the product of the two and inserting EEff into Equation 6 yields a value of approximately 130,000 flashes. This number scales with the inverse square of distance, so at approximately 2 m, the max safe limit would be approximately 520,000 flashes, for example.

Exemplary Procedure

| Algorithm 1 Fast image deconvolution using hyper-Laplacian priors |
| --- |
| Require: Blurred image y, kernel k, regularization weight λ, exponent α (≤0) |
| Require: β regime parameters: $\beta_0$, $\beta_{\textit{Inc}}$, $\beta_{\textit{Max}}$ |
| Require: Number of inner iterations T. |
| 1:  β = $\beta_0$, x = y |
| 2:  Precompute constant terms in Eqn. 4. |
| 3:  while β < $\beta_{\textit{Max}}$ do |
| 4:      iter = 0 |
| 5:      for i = 1 to T do |
| 6:          Given x, solve Eqn. 5 for all pixels using a LUT to give w |
| 7:          Given w, solve Eqn. 4 to give x |
| 8:      end for |
| 9:      β = $\beta_{\textit{Inc}}$ · β |
| 10: end while |
| 11: return Deconvolved image x |

Following is an example introduction and description of the non-blind deconvolution problem. In this example, x is the original uncorrupted linear grayscale image of N pixels, and y is an image degraded by blur and/or noise, which can be produced by convolving x with a blur kernel k and adding zero mean Gaussian noise. For example, y and k can be given and seek to reconstruct x. Given the ill-posed nature of the task, it is possible to regularize using, e.g., a penalty function $|\cdot|^\alpha$ that can act on the output of a set of filters $f_1, \ldots, f_j$ applied to x. A weighting term λ can control the strength of the regularization. From a probabilistic perspective, it is possible to seek the MAP estimate of x: $p(x|y, k) \propto p(y|x, k)p(x)$, the first term being a Gaussian likelihood and second being the hyper-Laplacian image prior. Maximizing $p(x|y, k)$ can be equivalent to minimizing the cost $-\log p(x|y, k)$:

$$\min_x \sum_{i=1}^{N} \left( \frac{\lambda}{2}(x \oplus k - y)_i^2 + \sum_{j=1}^{J} |(x \oplus f_j)_i|^\alpha \right) \qquad (8)$$

where i is the pixel index, and $\oplus$ is the 2-dimensional convolution operator. For simplicity, it is possible to use two first-order derivative filters $f_1=[1 \ -1]$ and $f_2=[1 \ -1]^T$, although additional ones can easily be added, e.g. learned filters (see, e.g., Osindero et al., *Topographic product models applied to natural scene statistics*, Neural Computation (1995) and Roth et al., supra) or higher order derivatives. For, e.g., brevity, it is possible to denote $F_i^j x \equiv (x \oplus f_j)_i$ for j=1, ..., J.

Using the half-quadratic penalty method (see, e.g., Geman and Reynolds, supra, Geman and Yang, supra, and Wang, Y. et al., supra), it is possible to introduce auxiliary variables $w_i^1$ and $w_i^2$ (together denoted as w) at each pixel that allow us to move the terms $F_i^j x$ outside the $|\cdot|^\alpha$ expression, giving a new cost function:

$$\min_{x,w} \sum_i \left( \frac{\lambda}{2}(x \oplus k - y)_i^2 + \frac{\beta}{2}(\|F_i^1 x - w_i^1\|_2^2 + \|F_i^2 x - w_i^2\|_2^2) + |w_i^1|^\alpha + |w_i^2|^\alpha \right) \quad (9)$$

where $\beta$ is a weight that can be varied during the optimization process, as described herein above. As $\beta \to \infty$, the solution of Equation 9 converges to that of Equation 8. Minimizing Equation 9 for a fixed $\beta$ can be performed by alternating between two steps, one where it is possible to solve for x, given values of w and vice-versa. One exemplary aspect of the exemplary procedure according to the present disclosure lies in the w sub-problem, but first briefly described herein is the x sub-problem and its relatively straightforward solution.

Exemplary x Sub-Problem

Given a fixed value of w from the previous iteration, Equation 9 is quadratic in x. Thus, the optimal x can be:

$$\left( F^{1^T} F^1 + F^{2^T} F^2 + \frac{\lambda}{\beta} K^T K \right) x = F^{1^T} w^1 + F^{2^T} w^2 + \frac{\lambda}{\beta} K^T y \quad (10)$$

where $Kx \equiv x \oplus k$.

Assuming circular boundary conditions, it is possible to apply 2D FFT's which can diagonalize the convolution matrices $F^1, F^2, K$, making it possible to find the optimal x directly:

$$x = \mathcal{F}^{-1} \left( \frac{\mathcal{F}(F^1)^* \circ \mathcal{F}(w^1) + \mathcal{F}(F^2)^* \circ \mathcal{F}(w^2) + (\lambda/\beta)\mathcal{F}(K)^* \circ \mathcal{F}(y)}{\mathcal{F}(F^1)^* \circ \mathcal{F}(F^1) + \mathcal{F}(F^2)^* \circ \mathcal{F}(F^2) + (\lambda/\beta)\mathcal{F}(K)^* \circ \mathcal{F}(K)} \right) \quad (11)$$

where * is the complex conjugate and $\circ$ denotes component-wise multiplication. The division can also be performed component-wise. Solving Equation 11 uses only 3 FFT's at each iteration since many of the terms can be precomputed. The form of this sub-problem can be the same to that as described in, e.g., Wang, Y. et al., supra.

Exemplary w Sub-Problem

Given a fixed x, finding the optimal w can consist of solving 2N independent 1D problems of the form:

$$w^* = \arg\min_w |w|^\alpha + \frac{\beta}{2}(w-v)^2 \quad (12)$$

where $v \equiv F_i^j x$.

Two exemplary approaches/procedures to finding w* in accordance with the present disclosure can be described as follows.

Exemplary Lookup Table (LUT)

For a fixed value of $\alpha$, w* in Equation 12 can depend only on two variables, $\beta$ and v, hence can easily be tabulated off-line to form a lookup table. It is possible to numerically solve Equation 12 for 10,000 different values of v over the range encountered in this exemplary problem ($-0.6 \leq v \leq 0.6$). This can be repeated for different $\beta$ values, such as for integer powers of $\sqrt{2}$ between 1 and 256. Although the LUT gives an approximate solution, it can allow the w sub-problem to be solved very quickly for any $\alpha > 0$.

Exemplary Analytic Solution

For some specific values of $\alpha$, it is possible to derive exact analytical solutions to the sub-problem. For $\alpha=2$, the sub-problem is quadratic and thus relatively easily solved. If $\alpha=1$, Equation 12 can reduce to a 1-D shrinkage operation (see, e.g., Wang, Y. et al., supra). For certain special cases of $1 < \alpha < 2$, there can exist analytic solutions (see, e.g., Wright, et al., *Sparse reconstruction by separable approximation*, IEEE Trans. Signal Processing (2009)). Here, it is possible to address the more challenging case of $\alpha < 1$ and now described is an exemplary procedure to solve Equation 12 for two exemplary cases of $\alpha=\frac{1}{2}$ and $\alpha=\frac{2}{3}$. For non-zero w, setting the derivative of Equation 12 w.r.t w to zero can provide:

$$\alpha |w|^{\alpha-1} \text{sign}(w) + \beta(w-v) = 0 \quad (13)$$

For $\alpha=\frac{1}{2}$, this becomes, with successive simplification:

$$|w|^{-1/2} \text{sign}(w) + 2\beta(w-v) = 0 \quad (14)$$

$$|w|^{-1} = 4\beta^2 (v-w)^2 \quad (15)$$

$$w^3 - 2vw^2 + v^2 w - \text{sign}(w)/4\beta^2 = 0 \quad (16)$$

Equation 16 may first appear to be two different cubic equations with the $\pm 1/4\beta^2$ term. However, it is possible to consider that only one of these as v is fixed and that w* lies between 0 and v. Thus, sign(v) can replace sign(w) in Equation 16:

$$w^3 - 2vw^2 + v^2 w - \text{sign}(v)/4\beta^2 = 0 \quad (17)$$

For $\alpha=\frac{2}{3}$, using a similar derivation yields:

$$w^4 - 3vw^3 + 3v^2 w^2 - v^3 w + \frac{8}{27\beta^3} = 0 \quad (18)$$

there being no sign(w) term as it conveniently cancels in this case. Thus, w*, the solution of Equation 12, can be, e.g., either 0 or a root of the cubic polynomial in Equation 10 for $\alpha=\frac{1}{2}$, or equivalently a root of the quartic polynomial in Equation 17 for $\alpha=\frac{2}{3}$. Although it can be tempting to attempt the same manipulation for $\alpha=\frac{3}{4}$, doing so can result in a 5th order polynomial, which can thus be solved numerically.

Finding the roots of the cubic and quartic polynomials: Analytic formulae exist for the roots of cubic and quartic polynomials (see, e.g., E. W. Weisstein, *Cubic formula*, available at http://mathworld.wolfram.com/CubicFormula.html (last accessed Jan. 7, 2010), and E. W. Weisstein, *Quartic equation*, available at http://mathworld.wolfram.com/QuarticEquation.html (last accessed Jan. 7, 2010)) and they can form the basis of the exemplary approach detailed in exemplary Algorithms/Procedures 2 and 3, for example.

---
Algorithm 2: Solve Eqn. 5 for $\alpha = \frac{1}{2}$

Require: Target value v, Weight $\beta$
1: $\epsilon = 10^{-6}$
2: {Compute intermediary terms $m, t_1, t_2, t_3$}
3: $m = -\text{sign}(v)/4\beta^2$
4: $t_1 = 2v/3$
5: $t_2 = \sqrt[3]{-27m - 2v^3 + 3\sqrt{3}\sqrt{27m^2 + 4mv^3}}$
6: $t_3 = v^2/t_2$
7: {Compute 3 roots, $r_1, r_2, r_s$:}
8: $r_1 = t_1 + 1/(3 \cdot 2^{1/3}) \cdot t_2 + 2^{1/3}/3 \cdot t_3$
9: $r_2 = t_1 - (1 - \sqrt{3}i)/(6 \cdot 2^{1/3}) \cdot t_2$
 $\quad - (1 + \sqrt{3}i)/(3 \cdot 2^{2/3}) \cdot t_3$
10: $r_s = t_1 - (1 + \sqrt{3}i)/(6 \cdot 2^{1/3}) \cdot t_2$
 $\quad - (1 - \sqrt{3}i)/(3 \cdot 2^{2/3}) \cdot t_3$
11: {Pick global minimum from $(0, r_1, r_2, r_s)$}
12: $r = [r_1, r_2, r_3]$
13: $c_1 = (\text{abs}(\text{imag}(r)) < \epsilon)$ {Root must be real}
14: $c_2 = \text{real}(r)\text{sign}(v) > (\frac{2}{3} \cdot \text{abs}(v))$
 {Root must obey bound of Eqn. 13}
15: $c_3 = \text{real}(r)\text{sign}(v) < \text{abs}(v)$ {Root $< v$}
16: $w^* = \max((c_1 \& c_2 \& c_3)\text{real}(r)\text{sign}(v))\text{sign}(v)$
 return $w^*$
---

---
Algorithm 3: Solve Eqn. 5 for $\alpha = \frac{2}{3}$

Require: Target value v, Weight $\beta$
1: $\epsilon = 10^{-6}$
2: {Compute intermediary terms $m, t_1, \ldots, t_7$:}
3: $m = 8/(27\beta^3)$
4: $t_1 = -\frac{9}{8} \cdot v^2$
5: $t_2 = v^3/4$
6: $t_3 = -\frac{1}{8} \cdot mv^2$
7: $t_4 = -t_3/2 + \sqrt{-m^3/27 + m^2v^4/256}$
8: $t_5 = \sqrt[3]{t_4}$
9: $t_6 = 2(-\frac{5}{18} \cdot t_1 + t_5 + m/(3 \cdot t_5))$
10: $t_7 = \sqrt{t_1/3 + t_6}$
11: {Compute 4 roots, $r_1, r_2, r_3, r_4$:}
12: $r_1 = 3v/4 + (t_7 + \sqrt{-(t_1 + t_6 + t_2/t_7)})/2$
13: $r_2 = 3v/4 + (t_7 - \sqrt{-(t_1 + t_6 + t_2/t_7)})/2$
14: $r_3 = 3v/4 + (-t_7 + \sqrt{-(t_1 + t_6 + t_2/t_7)})/2$
15: $r_4 = 3v/4 + (-t_7 - \sqrt{-(t_1 + t_6 + t_2/t_7)})/2$
16: {Pick global minimum from $(0, r_1, r_2, r_3, r_4)$}
17: $r = [r_1, r_2, r_3, r_4]$
18: $c_1 = (\text{abs}(\text{imag}(r)) < \epsilon)$ {Root must be real}
19: $c_2 = \text{real}(r)\text{sign}(v) > (\frac{1}{2} \cdot \text{abs}(v))$
 {Root must obey bound in Eqn. 13}
20: $c_3 = \text{real}(r)\text{sign}(v) < \text{abs}(v)$ {Root $< v$}
21: $w^* = \max((c_1 \& c_2 \& c_3)\text{real}(r)\text{sign}(v))\text{sign}(v)$
 return $w^*$
---

In both the exemplary cubic and quartic cases, the computational bottleneck can be the cube root operation. An alternative way of finding the roots of the polynomials Equation 17 and Equation 18 is to use a numerical root-finder, such as, e.g., Newton-Raphson. In exemplary experiments, Newton-Raphson was found to be slower and less accurate than either the exemplary analytic method or the LUT approach in accordance with the present disclosure.

Selecting the Correct Roots:

Given the roots of the polynomial, it is possible to determine which one corresponds to the global minima of Equation 12. For example, when $\alpha=\frac{1}{2}$, the resulting cubic equation can have, e.g., (a) 3 imaginary roots, (b) 2 imaginary roots and 1 real root, or (c) 3 real roots. In the case of (a), the $|w|^\alpha$ term means Equation 12 has positive derivatives around 0 and the lack of real roots implies the derivative can not become negative, thus $w^*=0$. For the case of (b), the costs of the single real root and $w=0$ are compared, an operation that can be efficiently performed using, e.g., Equation 20 (below).

In the (c) case, it is possible to have 3 real roots. Examining Equation 14 and Equation 15, it can be seen that the squaring operation can introduce a spurious root above v when v>0, and below v when v<0. This root can be ignored in this example since $w^*$ lies between 0 and v. The cost function in Equation 19 (below) has a local maximum near 0 and a local minimum between this local maximum and v. Thus, of the 2 remaining roots, the one further from 0 can have a lower cost. The cost of this root can be compared with that of $w=0$ using, e.g., Equation 20.

Similar analysis and reasoning for the $\alpha=\frac{2}{3}$ case can be used. For example, it is possible to potentially have: (a) 4 imaginary roots, (b) 2 imaginary and 2 real roots or (c) 4 real roots. In the case of (a), $w^*=0$ is the only solution. For the (b) case, it is possible to select the larger of the 2 real roots and compare the costs with $w=0$ using, e.g., Equation 20, similar to the case of 3 real roots for the cubic. It is possible that case (c) can never occur in this example with the final quartic polynomial Equation 18 being derived with a cubing operation from the analytic derivative. This can introduce 2 spurious roots into the final solution, both of which can be imaginary. Thus, it is possible that only cases (a) and (b) can be possible in this example.

In both the cubic and quartic cases, an efficient way to pick between $w=0$ and a real root that is between 0 and v can be used. Now described is a direct mechanism for doing this without involving the relatively expensive computation of the cost function in Equation 12, which can involve the calculation of a fractional power that can be slow, particularly if, e.g., $\alpha=\frac{2}{3}$.

For example, r can be the non-zero real root. 0 can be chosen if it has lower cost in Equation 12. This can imply:

$$|r|^\alpha + \frac{\beta}{2}(r-v)^2 > \frac{\beta v^2}{2} \qquad (19)$$

$$\text{sign}(r)|r|^{\alpha-1} + \frac{\beta}{2}(r - 2v) \leq 0, \; r \leq 0$$

Since it can be possible to only consider roots of the polynomial in this example, Equation 13 can be used to eliminate $\text{sign}(r)|r|^{\alpha-1}$ from Equation 13 and Equation 19, yielding the condition:

$$r \leq 2v\frac{(\alpha-1)}{(\alpha-2)}, \; v \geq 0 \qquad (20)$$

since $\text{sign}(r)=\text{sign}(v)$. So $w^*=r$ if r is between $2v/3$ and v in the $\alpha=\frac{1}{2}$ case or between $v/2$ and v in the $\alpha=\frac{2}{3}$ case. Otherwise $w^*=0$. Using this exemplary result, picking $w^*$ can be efficiently coded, e.g. lines 12-16 of exemplary Algorithm/Procedure 2. Overall, the exemplary analytic approach/procedure can be slower than the exemplary LUT, but the exemplary analytic approach/procedure can provide a more exact solution to the w sub-problem, for example.

Summary of Exemplary Procedure

The following in a description of the exemplary embodiment of the procedure using an exemplary LUT for the w sub-problem. Referring again to FIG. 14, as outlined in exemplary Algorithm/Procedure 1, it is possible to minimize Equation 9 by alternating the x and w sub-problems T times before increasing the value of ft and repeating. Starting with a small value $\beta_0$ it is possible to scale it by a factor $\beta_{Inc}$ until it exceeds some fixed value $\beta_{max}$. In practice, it can be found that a single inner iteration can suffice (T=1), although more can sometimes be needed when $\beta$ is small.

As with any non-convex optimization problem, it can be difficult to derive any guarantees regarding the convergence of exemplary Algorithm/Procedure 1. However, it can be possible to confirm that the global optimum of each sub-problem will be found, given the fixed x and w from the previous iteration. Like other methods that can use this form of alternating minimization (see, e.g., Geman and Reynolds, supra, Geman and Yang, supra, and Wang, Y. et al., supra), there can be little theoretical guidance for setting the $\beta$ schedule. It is possible to find that the simple scheme shown in exemplary Algorithm/Procedure 1 can work well to minimize Equation 9 and its proxy Equation 8. The experiments described herein show that exemplary embodiments according to the present disclosure can achieve similar signal-to-noise ratio (SNR) levels to iteratively reweighted least squares (IRLS) based approaches, but at a substantially lower computational cost, for example.

Exemplary Experiments

It is possible to evaluate the deconvolution performance of certain exemplary algorithms/procedures on images, comparing them to numerous other methods: e.g., (i) $l_2$ (Gaussian) prior on image gradients; (ii) Lucy-Richardson (see, e.g., W. Richardson, *Bayesian-based iterative method of image restoration* 62, 55-59 (1972)); (iii) the algorithm described in, e.g., Wang et al., supra, using a total variation (TV) norm prior and (iv) a variant of the algorithm described in, e.g., Wang et al., supra, using an $l_1$ (Laplacian) prior; and (v) the IRLS approach described in, e.g., Levin, Fergus, Durand and Freeman, supra, using a hyper-Laplacian prior with $\alpha=\frac{1}{2}$, $\frac{2}{3}$, $\frac{4}{5}$. In this example, only IRLS and the exemplary procedure according to the present disclosure use a prior with $\alpha<1$. For the IRLS scheme, it is possible to use, e.g., the implementation described in, e.g., Levin, Fergus, Durand and Freeman, supra, with default parameters but with the removal of higher order derivative filters to enable a direct comparison with other approaches. For example, IRLS and $l_2$ can directly minimize Equation 8, while certain exemplary embodiments in accordance with the present disclosure, and the TV and $l_1$ approaches described in, e.g., Wang et al., supra, can minimize the cost in Equation 9, using, e.g., T=1, $\beta_0=1$, $\beta_{Inc}=2\sqrt{2}$, $\beta_{Max}=256$. In this exemplary embodiment, $\alpha=\frac{1}{2}$ and $\alpha=\frac{2}{3}$ can be used, and the performance of the LUT and analytic methods can be compared as well. For example, the runs can be performed with multithreading enabled (e.g., over 4 CPU cores).

It is possible to evaluate the exemplary procedures using a set of blurry images, created in the following way, for example. In certain exemplary experiments, 7 in-focus grayscale real-world images were downloaded from the world wide web. The images were then blurred by real-world camera shake kernels as described in, e.g., Levin, Weiss, Durand and Freeman, *Understanding and evaluating blind deconvolution algorithms*, CVPR (2009). 1% Gaussian noise was added, followed by quantization to 255 discrete values. In a practical deconvolution setting, the blur kernel can not be perfectly known. Therefore, the kernel passed in the exemplary procedures was a minor perturbation of the true kernel to mimic kernel estimation errors. In certain exemplary experiments with non-perturbed kernels, the results can be similar to those in exemplary Tables 3 and 1, but with slightly higher SNR levels, for example.

Figure 14:
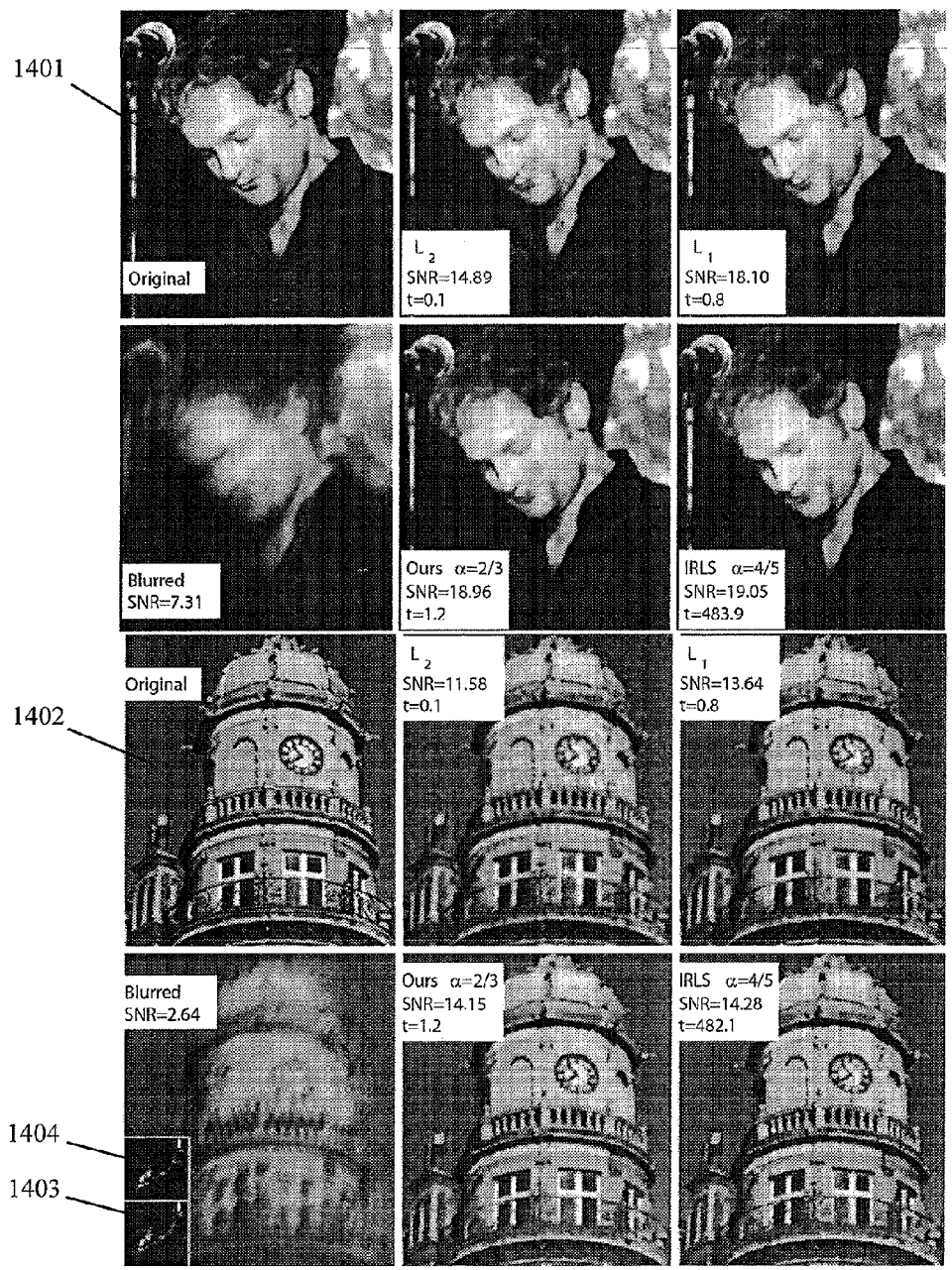
FIG. 14 are exemplary crops from two images being deconvolved by four different procedures.

FIG. 14 shows exemplary crops from two images 1401, 1402 being deconvolved by 4 different algorithms, including one in accordance an exemplary embodiment of the present disclosure using a 27×27 kernel. Inset 1403 shows the original kernel as described in, e.g., Levin, Weiss, Durand and Freeman, supra, and the perturbed version 1404 provided to the algorithms. In this example, the exemplary evaluation metric was the SNR between the original image $\hat{x}$ and the deconvolved output x, which can be defined as, e.g., $$10\log_{10}\frac{\|\hat{x}-\mu(\hat{x})\|^2}{\|\hat{x}-x\|^2},$$

$\mu(\hat{x})$ being the mean of $\hat{x}$.

Using exemplary Table 1, it is possible to compare the exemplary procedures on 7 different images, all blurred with the same 19×19 kernel. For each exemplary procedure, it is possible to search over different regularization weights $\lambda$ to find the value that gives the best SNR performance, as reported in the table. In Table 3, it is possible to evaluate the exemplary procedures with the same 512×512 image blurred by 8 different kernels (see, e.g., Levin, Weiss, Durand and Freeman, supra) of varying size. Again, the optimal value of $\lambda$ for each kernel/exemplary procedure combination can be chosen from a range of values based on SNR performance. Exemplary Table 2 shows the running time of several exemplary procedures on images up to 3072×3072 pixels. FIG. 14 (bottom part) shows a larger 27×27 blur being deconvolved from two example images, comparing the output of different methods.

Figure 15B:
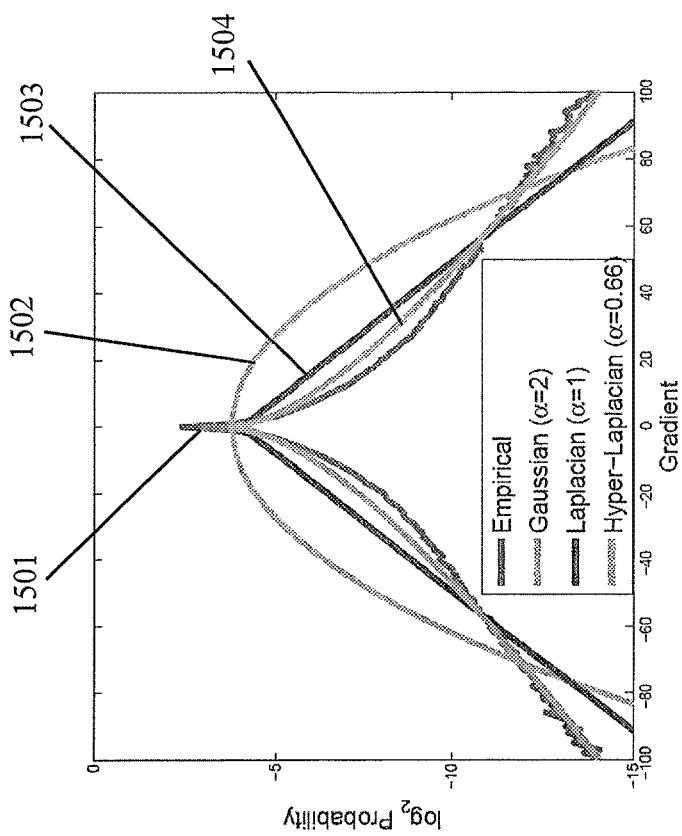
FIG. 15($a$) is an exemplary image of a typical real-world scene.
Figure 15A:
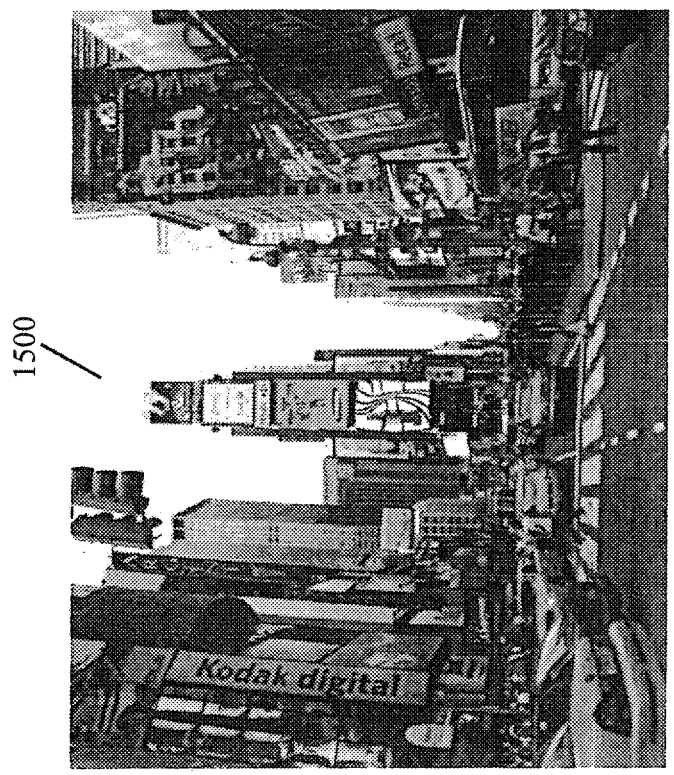

FIGS. 15(*a*) and 15(*b*) show an exemplary image and graph illustrating that a hyper-Laplacian with exponent $\alpha=\frac{2}{3}$ can be a better model of image gradients than a Laplacian or a Gaussian model. For example, FIG. 15(*a*) shows an exemplary image 1500 of a typical real-world scene. FIG. 15(*b*) shows an exemplary empirical distribution of gradients 1501 in the scene, along with a Gaussian fit 1502, a Laplacian fit 1503 and a hyper-Laplacian with $\alpha=\frac{2}{3}$ 1504. As shown, the hyper-Laplacian can fit the empirical distribution closely, particularly in the tails.

The exemplary tables and figures show that an exemplary procedure with $\alpha=\frac{2}{3}$ and IRLS with $\alpha=\frac{4}{5}$ can yield higher quality results than other methods. However, the exemplary procedure can be approximately 70 to 350 times faster than IRLS depending on whether the analytic or LUT method is used, for example. This speedup factor can be independent of image size, as shown by Table 2. The $l_1$ method described in, e.g., Wang, Y. et al., supra, can be considered to be the best of the other methods being of comparable speed to certain exemplary procedure but achieving lower SNR scores. The SNR results for the exemplary procedure as shown in this example can be almost the same whether LUTs or an exemplary analytic approach is used. Thus, in practice, the LUT procedure can be preferred, since it can be approximately 5 times faster than the exemplary analytic procedure and can be used for virtually any value of $\alpha$.

TABLE 1

| Image # | Blurry | $l_2$ | Lucy | TV | $l_1$ | IRLS $\alpha = \frac{1}{2}$ | IRLS $\alpha = \frac{2}{3}$ | IRLS $\alpha = \frac{4}{5}$ | Ours $\alpha = \frac{1}{2}$ | Ours $\alpha = \frac{2}{3}$ |
|---|---|---|---|---|---|---|---|---|---|---|
| 1 | 6.42 | 14.13 | 12.54 | 15.87 | 16.18 | 14.61 | 15.45 | 16.04 | 16.05 | 16.44 |
| 2 | 10.73 | 17.56 | 15.15 | 19.37 | 19.86 | 18.43 | 19.37 | 20.00 | 19.78 | 20.26 |
| 3 | 12.45 | 19.30 | 16.68 | 21.83 | 22.77 | 21.53 | 22.62 | 22.95 | 23.26 | 23.27 |
| 4 | 8.51 | 16.02 | 14.27 | 17.66 | 18.02 | 16.34 | 17.31 | 17.98 | 17.70 | 18.17 |
| 5 | 12.74 | 16.59 | 13.28 | 19.34 | 20.25 | 19.12 | 19.99 | 20.20 | 21.28 | 21.00 |
| 6 | 10.85 | 15.46 | 12.00 | 17.13 | 17.59 | 15.59 | 16.58 | 17.04 | 17.79 | 17.89 |
| 7 | 11.76 | 17.40 | 15.22 | 18.58 | 18.85 | 17.08 | 17.99 | 18.61 | 18.58 | 18.96 |
| Av. SNR gain | | 6.14 | 3.67 | 8.05 | 8.58 | 7.03 | 7.98 | 8.48 | 8.71 | 8.93 |
| Av. Time (secs) | | 79.85 | 1.55 | 0.66 | 0.75 | 354 | 354 | 354 | L: 1.01 A: 5.27 | L: 1.00 A: 4.08 |

Exemplary Table 1 shows an exemplary comparison of SNRs and running time of 9 different methods for the deconvolution of 7 576×864 images, blurred with the same 19×19 kernel. L=Lookup table, A=Analytic. The best performing algorithm for each kernel is shown in bold. In this example, the exemplary embodiment of the procedure according to the present disclosure with $\alpha=\frac{2}{3}$ can beat IRLS with $\alpha=\frac{4}{5}$, as well as being substantially faster. On average, both of these exemplary methods can outperform demonstrating the benefits of a sparse prior.

TABLE 2

| Image size | $l_1$ | IRLS $\alpha = 4/5$ | Ours (LUT) $\alpha = 2/3$ | Ours (Analytic) $\alpha = 2/3$ |
|---|---|---|---|---|
| 256 × 256 | 0.24 | 78.14 | 0.42 | 0.7 |
| 512 × 512 | 0.47 | 256.87 | 0.55 | 2.28 |
| 1024 × 1024 | 2.34 | 1281.3 | 2.78 | 10.87 |
| 2048 × 2048 | 9.34 | 4935 | 10.72 | 44.64 |
| 3072 × 3072 | 22.40 | — | 24.07 | 100.42 |

TABLE 3

| Kernel #/size | Blurry | $l_2$ | Lucy | TV | $l_1$ | IRLS $\alpha = \frac{1}{2}$ | IRLS $\alpha = \frac{2}{3}$ | IRLS $\alpha = \frac{4}{5}$ | Ours $\alpha = \frac{1}{2}$ | Ours $\alpha = \frac{2}{3}$ |
|---|---|---|---|---|---|---|---|---|---|---|
| #1: 13 × 13 | 10.69 | 17.22 | 14.49 | 19.21 | 19.41 | 17.20 | 18.22 | 18.87 | 19.36 | 19.66 |
| #2: 15 × 15 | 11.28 | 16.14 | 13.81 | 17.94 | 18.29 | 16.17 | 17.26 | 18.02 | 18.14 | 18.64 |
| #3: 17 × 17 | 8.93 | 14.94 | 12.16 | 16.50 | 16.86 | 15.34 | 16.36 | 16.99 | 16.73 | 17.25 |
| #4: 19 × 19 | 10.13 | 15.27 | 12.38 | 16.83 | 17.25 | 15.97 | 16.98 | 17.57 | 17.29 | 17.67 |
| #5: 21 × 21 | 9.26 | 16.55 | 13.60 | 18.72 | 18.83 | 17.23 | 18.36 | 18.88 | 19.11 | 19.34 |
| #6: 23 × 23 | 7.87 | 15.40 | 13.32 | 17.01 | 17.42 | 15.66 | 16.73 | 17.40 | 17.26 | 17.77 |
| #7: 27 × 27 | 6.76 | 13.81 | 11.55 | 15.42 | 15.69 | 14.59 | 15.68 | 16.38 | 15.92 | 16.29 |
| #8: 41 × 41 | 6.00 | 12.80 | 11.19 | 13.53 | 13.62 | 12.68 | 13.60 | 14.25 | 13.73 | 13.68 |
| Av. SNR gain | | 6.40 | 3.95 | 8.03 | 8.31 | 6.74 | 7.78 | 8.43 | 8.33 | 8.67 |
| Av. Time (sec) | | 57.44 | 1.22 | 0.50 | 0.55 | 271 | 271 | 271 | L: 0.81 A: 2.15 | L: 0.78 A: 2.23 |

Exemplary Table 2 shows exemplary run-times of different methods for a range of image sizes, using a 13×13 kernel. The exemplary LUT procedure can be more than 100 times faster than the IRLS method as described in, e.g., Levin, Fergus, Durand and Freeman, supra.

Exemplary Discussion

Described herein are exemplary image deconvolution schemes that can be, e.g., fast, conceptually simple and yield high quality results. Exemplary procedures can take a novel approach to the non-convex optimization problem arising from the use of a hyper-Laplacian prior, by using a splitting approach that can allow the non-convexity to become separable over pixels. Using a LUT to solve this sub-problem allows for orders of magnitude speedup in the solution over existing methods. Additional exemplary embodiments in accordance with the present disclosure are available at, e.g., D. Krishnan, *Publications*, http://cs.nyu.edu/~dilip/wordpress/ (last accessed Jan. 7, 2010).

Common to the TV and $l_1$ approaches such as that described in, e.g., Wang, Y. et al., supra, can use frequency domain operations which can assume circular boundary conditions can be something not present in real images. These can give rise to boundary artifacts which can be overcome to an extent with edge tapering operations.

Exemplary embodiments in accordance with the present disclosure can be adapted to a range of other problems than those specifically discussed and described herein which, e.g., can rely on natural image statistics. For example, by setting k=1 the exemplary procedure can be used to denoise; or, if k is a defocus kernel, the exemplary procedure can be used for super-resolution. The speed that can be provided by exemplary procedures in accordance with the present disclosure can be practical to perform these exemplary operations on the multi-megapixel images from modern cameras, for example.

Exemplary Table 3 shows an exemplary comparison of SNRs and run-times of 9 different methods for the deconvolution of a 512×512 image blurred by 7 different kernels. L=Lookup table, A=Analytic. In this example, the exemplary procedure according to the present disclosure beats all other methods in terms of quality, with the exception of IRLS on the largest kernel size. However, the exemplary procedure according to the present disclosure is faster than IRLS, being comparable in speed to the $l_1$ approach, for example.

Figure 16:
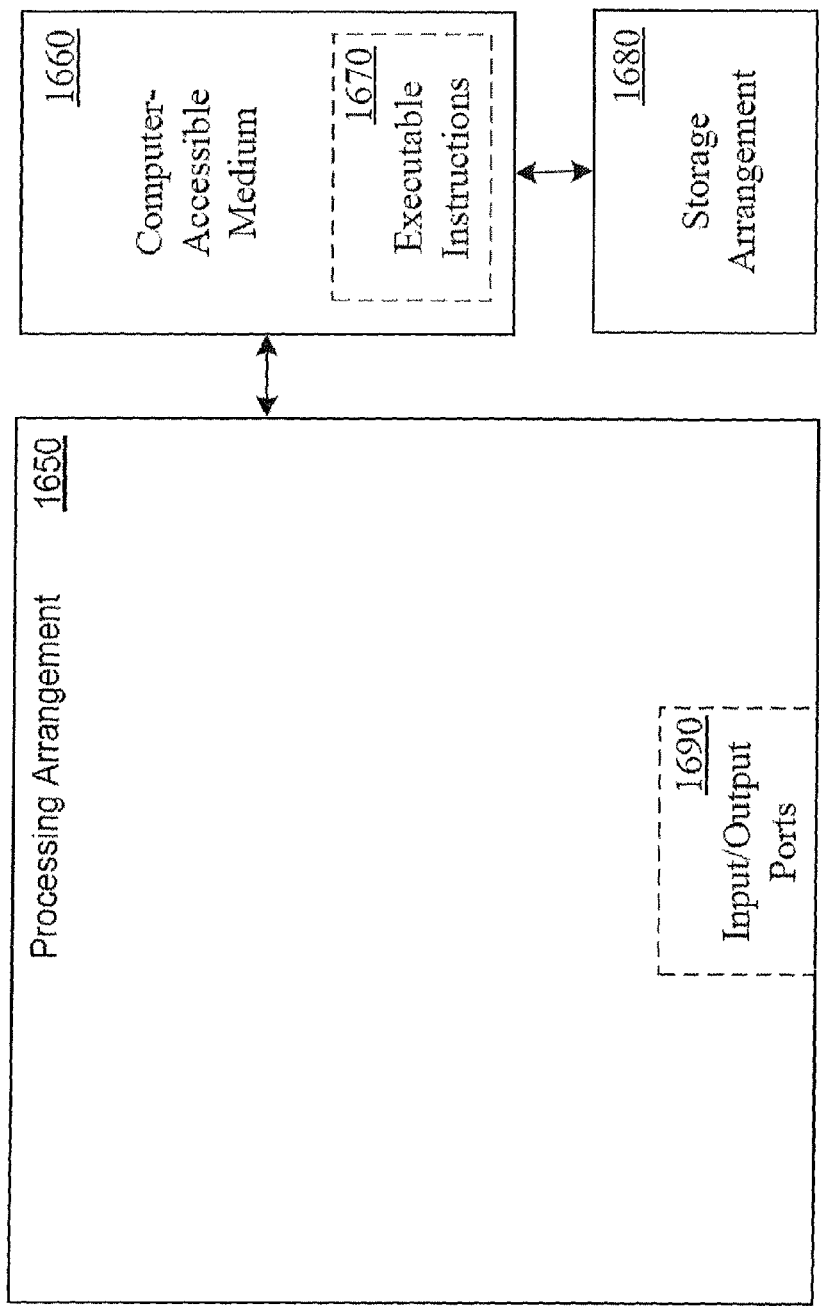
FIG. 16 is a block diagram of a system in accordance with an exemplary embodiment of the present disclosure.

FIG. 16 shows a block diagram of a system in accordance with an exemplary embodiment of the present disclosure. For example, an exemplary procedure in accordance with the present disclosure can be performed by a processing arrangement 1650. Processing arrangement 1650 can be, e.g., entirely or a part of, or include, but not limited to, a computer that includes, e.g., a microprocessor, and use instructions stored on a computer-accessible medium (e.g., RAM, ROM, hard drive, or other storage device).

As shown in FIG. 16, e.g., a computer-accessible medium 1660 (e.g., as described herein above, a storage device such as a hard disk, floppy disk, memory stick, CD-ROM, RAM, ROM, etc., or a collection thereof) can be provided (in communication with the processing arrangement 1650). The computer-accessible medium 1660 can contain executable instructions 1670 thereon. In addition or alternatively, a storage arrangement 1680 can be provided separately from the computer-accessible medium 1660, which can provide the instructions to the processing arrangement 1650 so as to configure the processing arrangement to execute certain exemplary procedures, processes and methods, as described herein above, for example.

Further, exemplary processing arrangement 1650 can be provided with or include an input arrangement, which can include, e.g., a wired network, a wireless network, the internet, an intranet, a data collection probe, a sensor, etc. Additionally, the exemplary processing arrangement 1650 can be provided with or include an output arrangement, which can include, e.g., a wired network, a wireless network, the internet, an intranet, etc., as well as a display arrangement and/or a storage arrangement in which data can be stored in a user-accessible format and/or user-readable format.

Figure 17:
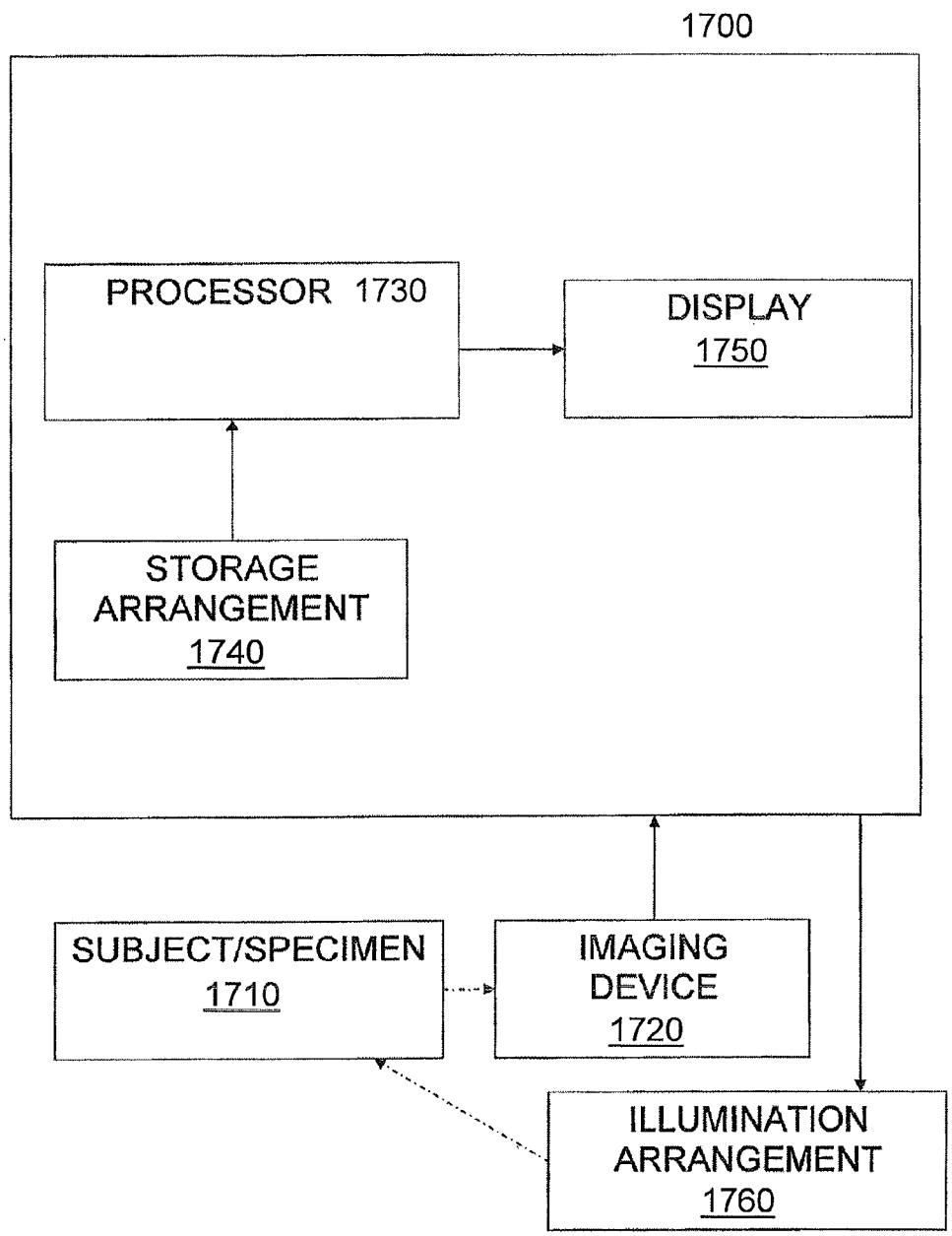
FIG. 17 is a block diagram of another exemplary embodiment of the system in accordance with the present disclosure.

FIG. 17 shows a block diagram of another exemplary embodiment of the system according to the present disclosure. A computer 1700 can be provided having a processor 1730 which can be configured or programmed to perform the exemplary steps and/or procedures of the exemplary embodiments of the techniques described herein above. For example, a subject/specimen 1710 can be positioned and an anatomical region of interest can be selected on the subject/specimen 1710. The imaging device 1720 can be used to obtain images for the subject/specimen 1710 which can be illuminated by an illumination arrangement 1760. The illumination arrangement 1760 can be controlled by the processor 1730. The data/images can be provided from the imaging device to the computer 1700, which can be transmitted to the exemplary processor 1730 and/or storage arrangement 1740.

According to certain exemplary embodiments of the present disclosure, the data can be stored in a storage arrangement 1740 (e.g., a hard drive, a memory device such as RAM, ROM, memory stick, floppy drive, etc.). The processor 1730 can access the storage arrangement 1740 to execute a computer program or a set of instructions (stored on or in the storage arrangement 1740) which can perform the procedures according to the exemplary embodiments of the present disclosure. Thus, e.g., when the processor 1730 performs such instructions and/or computer program, the processor 1730 can be configured to perform the exemplary embodiments of the procedures according to the present disclosure, as described herein above.

According to other certain illustrative embodiments, a storage medium (or computer-accessible medium containing instructions which receives a plurality of images) can be provided, such as, for example, the storage arrangement 1740. The images can preferably include at least one image taken without flash or with ambient light and at least one image that is taken with particular illumination. The particular illumination may preferably be not visible or partially visible to the subject. At least one of the illuminated images can be preferably illuminated with at least one UV frequency or frequency range and at least one of the illuminated images may be illuminated with at least one IR frequency or frequency range. Instructions can be used by the processor 1730 to process the flash and no-flash images according to exemplary procedures in accordance with the present disclosure as, e.g., described herein.

For example, display 1750 can also be provided for the exemplary system of FIG. 17. The storage arrangement 1740 and the display 1750 can be provided within the computer 1700 or external from the computer 1700. The information received by the processor 1730 and the information determined by the processor 1730, as well as the information stored on the storage arrangement 1740, can be, e.g., stored in the storage arrangement 1740 in a computer-readable/accessible format and/or displayed on the display 1750 in a user-readable format.

The foregoing merely illustrates the principles of the present disclosure. Various modifications and alterations to the embodiments described herein will be apparent to those having ordinary skill in the art in view of the teachings herein. It will thus be appreciated that those having ordinary skill in the art will be able to devise, e.g., numerous systems, arrangements, computer-accessible medium and methods/procedures, which, although not explicitly shown or described herein, embody the principles of the present disclosure and are thus within the spirit and scope of the present disclosure. Further, one having ordinary skill in the art will appreciate in view of the teachings provided in the present disclosure, that both the hardware and software elements disclosed herein can be used in a variety of other applications aside from those focused on dark flash photography. In addition, to the extent that the prior art knowledge has not been explicitly incorporated by reference herein above, it is explicitly being incorporated herein in its entirety. All publications referenced herein above are incorporated herein by reference in their entireties.

What is claimed is:

1. An apparatus for imaging at least one portion of a target, comprising:
   at least one light emitting arrangement configured to generate an ultraviolet (UV) light and an infrared (IR) light to impact the at least one portion;
   at least one sensor arrangement configured to receive (i) a further light from the at least one portion that is based on the UV light and the IR light provided to the at least one portion and (ii) an ambient light; and
   a computer processing arrangement configured to:
      generate at least one first image based on the further light,
      generate at least one second image based on the ambient light,
      determine a relationship between spectral bands corresponding to the at least one first image and the at least one second image, and
      generate a third image using the at least one first image and the at least one second image based on the relationship.

2. The apparatus according to claim 1, wherein the processing arrangement is further configured to identify noise associated with the at least one second image based on the relationship.

3. The apparatus according to claim 2, wherein the processor arrangement is further configured to at least one of reduce or remove the noise from the at least one second image.

4. The apparatus according to claim 3, wherein the processing arrangement is further configured to utilize an edge structure of the at least one first image to remove or reduce the noise.

5. The apparatus according to claim 1, wherein the processing arranged is further configured to generate the third image by selecting less than all edges of the at least one second image.

6. The apparatus according to claim 4, wherein the processing arrangement is further configured to select the less than all the edges in order to avoid at least one of at least one shadow or at least one specularity.

7. The apparatus according to claim 5, wherein the at least one shadow is an artifact in the at least one second image.

8. The apparatus according to claim 1, wherein the third image includes a plurality of colors from only the at least one first image.

9. The apparatus according to claim 1, wherein a wavelength of the ambient light is between 400 nanometers and 700 nanometers.

10. The apparatus according to claim 1, wherein a wavelength of the UV light is between 360 nanometers and 400 nanometers.

11. The apparatus according to claim 1, wherein a wavelength of the IR light is between 700 nanometers and 800 nanometers.

12. The apparatus according to claim 1, wherein the relationship between spectral bands comprises a correlation between spectral bands corresponding to the at least one first image and the at least one second image.

13. The apparatus according to claim 1, wherein the processing arrangement is further configured to generate the third image using a Fast Fourier transform.

14. The apparatus according to claim 1, wherein the processing arrangement is further configured to generate the third image using a lookup-table, and wherein the lookup-table comprises precomputed values stored in a storage arrangement.

15. The apparatus according to claim 1, wherein the processing arrangement is further configured to generate the third image using a continuation procedure which repeats until the third image is at least one of substantially denoised or substantially deconvoluted.

16. The apparatus according to claim 1, wherein the spectral bands include (i) a first spectral band for the IR light, (ii) a second spectral band for the UV light, and (iii) a third spectral band for the ambient light, and wherein the first spectral band, the second spectral band and the third spectral band are different from one another.

17. An apparatus for imaging at least one portion of a target, comprising:
at least one light emitting arrangement configured to generate an ultraviolet (UV) light and an infrared (IR) light to impact the at least one portion;
at least one sensor arrangement configured to receive (i) a further light from the at least one portion that is based on the UV light and the IR light provided to the at least one portion and (ii) an ambient light; and
a computer processing arrangement configured to:
determine a relationship between spectral bands corresponding to the further light and the ambient light, and
generate at least one image using the further light and the ambient light based on the relationship.

18. The apparatus according to claim 17, wherein the processing arrangement is further configured to identify noise associated with the further light based on the relationship.

19. The apparatus according to claim 18, wherein the processor arrangement is further configured to at least one of reduce or remove associated with the further light.

20. The apparatus according to claim 17, wherein at least one of (i) a wavelength of the ambient light is between 400 nanometers and 700 nanometers, (ii) a wavelength of the UV light is between 360 nanometers and 400 nanometers, or (iii) a wavelength of the IR light is between 700 nanometers and 800 nanometers.

21. A non-transitory computer-accessible medium having stored thereon computer executable instructions for imaging at least one portion of a target, wherein, when the executable instructions are executed by a processing arrangement, the processing arrangement is configured to perform procedures comprising:
(a) generating an ultraviolet (UV) light and an infrared (IR) light to impact the at least one portion;
(b) receiving (i) a further light from the at least one portion that is based on the UV light and the IR light provided to the at least one portion and (ii) an ambient light;
(c) determining a relationship between spectral bands corresponding to the further light and the ambient light; and
(d) generating at least one image using the further light and the ambient light based on the relationship.

22. The computer-accessible medium of claim 21, wherein the processing arrangement is further configured to:
generate at least one first image based on the further light; and
generate at least one second image based on the ambient light,
wherein the relationship between the spectral bands is determined between spectral bands corresponding to the at least one first image and the at least one second mage.

23. A method for imaging at least one portion of a target, comprising:
(a) generating an ultraviolet (UV) light and an infrared (IR) light to impact the at least one portion;
(b) receiving (i) a further light from the at least one portion that is based on the UV light and the IR light provided to the at least one portion and (ii) an ambient light;
(c) determining a relationship between spectral bands corresponding to the further light and the ambient light; and
(d) using a computer hardware arrangement, generating at least one image using the further light and the ambient light based on the relationship.

24. The method of claim 23, further comprising:
generating at least one first image based on the further light; and
generating at least one second image based on the ambient light,
wherein the relationship between the spectral bands is determined between spectral bands corresponding to the at least one first image and the at least one second mage.

25. A system for imaging at least one portion of a target, comprising:
a computer hardware arrangement configured to:
(a) generate an ultraviolet (UV) light and an infrared (IR) light to impact the at least one portion;
(b) receive (i) a further light from the at least one portion that is based on the UV light and the IR light provided to the at least one portion and (ii) an ambient light;
(c) determine a relationship between spectral bands corresponding to the further light and the ambient light; and
(d) generate at least one image using the further light and the ambient light based on the relationship.

26. The system of claim 25, wherein the computer hardware arrangement is further configured to:
generate at least one first image based on the further light; and
generate at least one second image based on the ambient light,
wherein the relationship between the spectral bands is determined between spectral bands corresponding to the at least one first image and the at least one second mage.

* * * * *